United States Patent

Jovic

[15] 3,692,949

[45] Sept. 19, 1972

[54] MULTI-STAGE ELECTRONIC SWITCHING NETWORK

[72] Inventor: Nikola L. Jovic, Chicago, Ill.

[73] Assignee: International Telephone and Telegraph Corporation, New York, N.Y.

[22] Filed: May 3, 1971

[21] Appl. No.: 139,891

Related U.S. Application Data

[63] Continuation of Ser. No. 7,413, Feb. 6, 1970, abandoned, which is a continuation of Ser. No. 584,140, Oct. 4, 1966, abandoned.

[52] U.S. Cl. .............................................179/18 GF
[51] Int. Cl. .............................................H04q 3/42
[58] Field of Search .................................179/18 GF

[56] References Cited

UNITED STATES PATENTS

| | | | |
|---|---|---|---|
| 3,201,520 | 8/1965 | Bereznak | 179/18.7 A |
| R26,498 | 12/1968 | Macrander | 179/18.7 H |

*Primary Examiner*—William C. Cooper
*Assistant Examiner*—William A. Helvestine
*Attorney*—C. Cornell Remsen, Jr., Rayson P. Morris, Percy P. Lantzy, T. Warren Whitesel, Phillip A. Weis and Delbert P. Warner

[57] ABSTRACT

A self-seeking current controlled electronic switching network comprised of a plurality of cascaded stages of switching matrices. Each vertical multiple has an associate RC network for controlling the duration of the turned-on time period of the crosspoints during a route search. The RC circuit controlled time periods are selected to make each stage of the network run at an independent frequency, the frequencies being selected as a function of (a) the dynamic biasing changes which occur in the crosspoints responsive to the turning on and off, (b) the dynamic tapering which occurs in the network responsive to busy vertical conditions, and (c) the frequency of preceding stages.

7 Claims, 26 Drawing Figures

INVENTOR
NIKOLA L. JOVIC
BY
[signature]
ATTORNEY

DC CHACTERISTICS OF PNPN DIODE

VARIATION OF DIODE FIRING POTENTIAL AS A FUNCTION OF SERIES RES. & REPETITION RATE

EQUIVALENT CIRCUITS OF PNPN DIODE

EFFECT OF DYNAMIC FORWARD BIAS

EFFECT OF DYNAMIC REVERSE BIAS

MODEL OF TYPICAL FIRING PATH

MULTI-STAGE ELECTRONIC SWITCHING NETWORK

The present invention is a continuation of application Ser. No. 7,413 filed on Feb. 6, 1970, now abandoned which, in turn, was a continuation of application Ser. No. 584,140 filed on Oct. 4, 1966 now abandoned.

This invention relates to electronic switching networks and more particularly to multi-stage networks especially — although not exclusively — useful for switching in automatic telephone systems. This invention is an improvement over an earlier invention shown in U.S. Pat. No. 3,204,044 entitled, "Electronic Switching Telephone System," granted Aug. 31, 1965 to Virgle E. Porter and assigned to the assignee of this invention.

In spite of the very great amount of attention given to the development of electronic switching networks, there remains room for pioneer improvements. For example, much work has been done on "end marked" networks using a plurality of cascaded switching matrices. Here, the ends of a desired switching path are electrically marked and crosspoint switches operate in the matrices to complete a number of paths which fan-out from at least one of the marked ends into the networks. When one of the fanning-out paths collide with something, a switching path is completed between the two end marked points. Sometimes the collision may occur in the the center of the network when paths fan-out from both ends. Sometimes it occurs at a marked end point when paths fan-out in a single direction. Thereafter, all remaining ones of the fanning-out circuits are released. Networks of the described type may use gas tubes, transistors, diodes, and glass reeds, etc., for crosspoints.

One trouble, which has been noted in the literature, is that the switch at the end point must carry an unduly heavy current as the fanning-out paths multiply. Some persons who have worked in the field have observed that as breakdown of the crosspoints proceeds from stage to stage in the establishment of a path through the network a progressively larger number of crosspoints becomes conducting in each stage. Because these persons have allowed the conducting crosspoints to remain latched in the low-impedance, high-current stage until the desired switch path has been completed, they have encountered a rather high current requirement which is a serious imposition upon the marking voltage source and the crosspoints near the network terminals. Since the total cumulative current of all latched crosspoints is many times the normal sustaining current of a path limited to a series of crosspoints and since the high cumulative current flows only during the fractional time while a network path is being established, these persons concluded that providing crosspoints capable of handling such large currents necessarily involves inefficient use of component capabilities. Therefore, to avoid this heavy current, these persons turned to complex control circuitry used to select a desired path. Unfortunately, however, these control circuits are extremely complex and expensive.

Applicant's assignee owns several patents, showing different ways of avoiding the heavy current types of operations. One of these patents is the above identified Porter patent. Among other things Porter, and those who have followed his teachings, have prevented excessive current at end points through a use of vertical bus capacitors which provide much of the current required for switching inside the matrix. These same capacitors control the electronic switch crosspoints which turn "on" and "off" in a completely random manner until a path finds its own way through the network.

Hereinafter, the words "timed systematic search" are used to describe a self-seeking search which occurs in switching network when it is modified according to my invention. It is a complete search which explores all idle paths according to an orderly plan established by static and dynamic biasing and by a control of the time constants involved. That is, crosspoints still switch "on" and "off" only at the mercy of chance—guided only by such things as variations within manufacturers tolerances for crosspoints, charges and currents in the network, busy conditions, etc. However, I have arranged the circuits to maximize the advantages resulting from these variations.

Accordingly, an object of this invention is to provide new and improved electronic switching networks. A more specific object is to provide relatively large multi-stage networks, especially — although not exclusively — adapted for use in telephone switching systems.

Another object of the invention is to provide end-marked, electronic switching matrices having self-selecting crosspoints which avoid the heavy current problems of some early types of network. In this connection, an object is to avoid expensive control circuitry.

Moreover, an object is to overcome the problems which can occur in a completely random selected crosspoint system where crosspoints fire blindly. Here, an object is to accomplish the above object without losing the benefits of the random selections. Consequently, an object is to provide end-marked matrices for extending self-seeking paths through electronic switch crosspoints in a more orderly manner.

An exemplary matrix which may be used with this invention has an electronic switching network formed of many cascaded stages. Each stage includes many matrices with first and second (or horizontal and vertical) multiples arranged to provide intersecting crosspoints. The intersecting multiples are electrically joined when the associated crosspoint switches are switched "on" and electrically isolated when the crosspoints are switched "off". The invention is not necessarily limited to a particular crosspoint. However, I prefer to use a PNPN diode.

A number of these matrices are cascaded by links joining the outlets of one matrix to the inlets of the next succeeding matrix. These links are coupled to RC networks which provide a vertical bus bias for controlling the firing characteristics of the crosspoints. Normally, the crosspoints switch on, and the resulting current into the capacitor holds the switch on for a discrete period of time after which the crosspoint turns off.

In carrying out the invention, the time constants of the RC networks connected to the vertical buses are selected to provide the same time characteristics within each stage and longer time constants between each succeeding stage. Thus, by way of example, if each stage has five crosspoints giving access to the next stage, the RC network values might be selected to give successive stage oscillation characteristics on a 5:1 ratio, while providing a ratio of substantially 1:1 with each stage.

Thus, in a purely hypothetical example, the RC networks could set up a firing repetition rate of, say 50 μs in the first stage, 250 μs in the second stage 1250 μs in the third stage, etc. This way, the crosspoint firings occur at a rate in each stage which insures that every crosspoint has an opportunity to see every other crosspoint. Stated differently, back bias of a previously fired diode in the second stage caused by a longer RC time constant in the second stage will prevent that diode from firing for a time period while a diode to which it is coupled in the first stage may fire several times. These characteristics of exemplary circuits provide two desirable results. First of all, by preventing a diode in the secondary from firing again soon after failure to complete a connection they reduce the number of attempts to find a path through unsuccessful routes. Secondly, by preventing all the most recently fired diodes in the second stage from firing again within a short period they enable a search to be attempted from a diode in the first stage through every diode to which it is coupled in the second stage.

Moreover, for those type of networks which experience the heavy current, there is a dynamic tapering in the number of turned on crosspoints which reduces the current rather than increases it, as the number of stages multiplies. For example, consider five successive cascaded stages where each stage has five crosspoints per inlet, each of which crosspoints forms an outlet that can see five crosspoints in the next succeeding stages. A total of 5+25+125+625+3125 or 3905 crosspoints turn on if every crosspoint turns on and latches. Obviously, the most excessive current requirements come from the crosspoints in the first stage. Then, the next most excessive current requirements occur in the penultimate stage, etc. If the network is arranged so that the crosspoints in the first stage are turning on and off in, say one-thousandth of the usual time, the current in that stage is reduced by a factor of one thousand. Aside from the simple expedient of turning on and turning off the crosspoints, my invention provides other means of reducing the firing in the last stages. At the first stage, there are only five crosspoints per inlet; thus, there is almost no excessive current if each turns "on" in a manner which eventually insures a full look at all of the diodes in the last stage. The same is true, to varying degrees, for the crosspoints in the intermediate stages. For convenience of expression, I call my network a "dynamically tapered" network.

The above mentioned and other features and objects of this invention and the manner of obtaining them will become more apparent, and the invention itself will be best understood by making reference to the following description of an embodiment of the invention taken in conjunction with the accompanying drawings wherein: FIG. 1 is a block diagram showing an electronic network as having four cascaded stages;

Figures 1, 2:
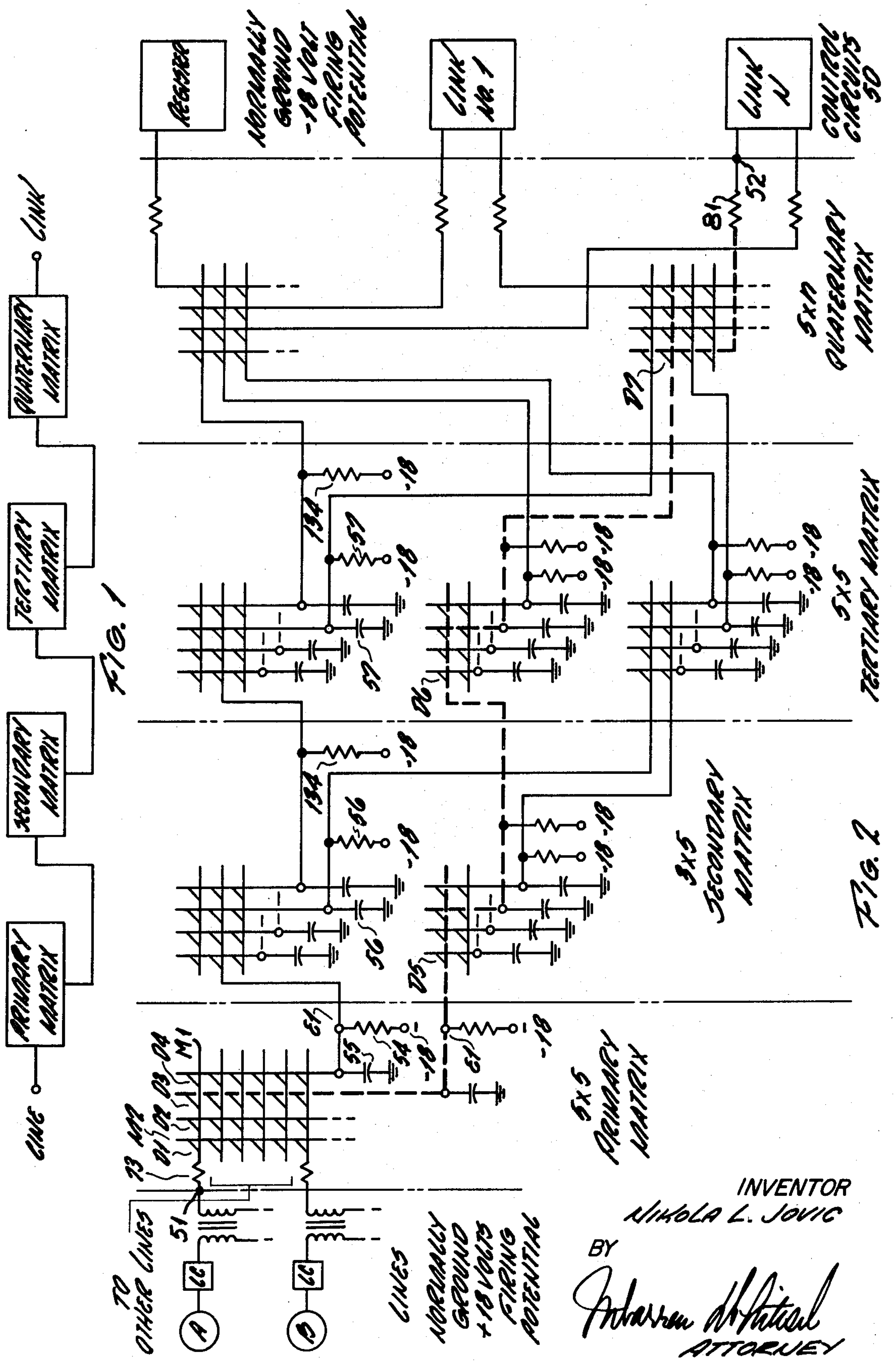
FIG. 2 is a schematic circuit diagram which shows a cascaded series of electronic switching matrices arranged to form an exemplary self seeking, randomly fired, end-marked matrix herein referred to as a Porter matrix and is useful for explaining the invention.
Figure 3:
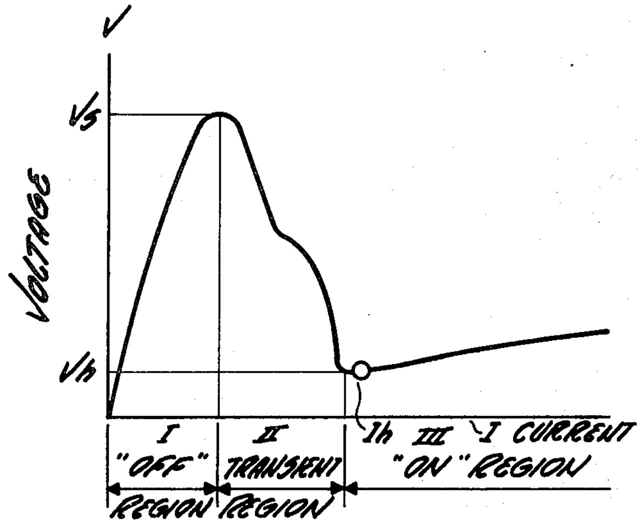
FIG. 3 is a graph which shows the characteristics of a PNPN diode plotting voltage against current.
Figures 6, 7:
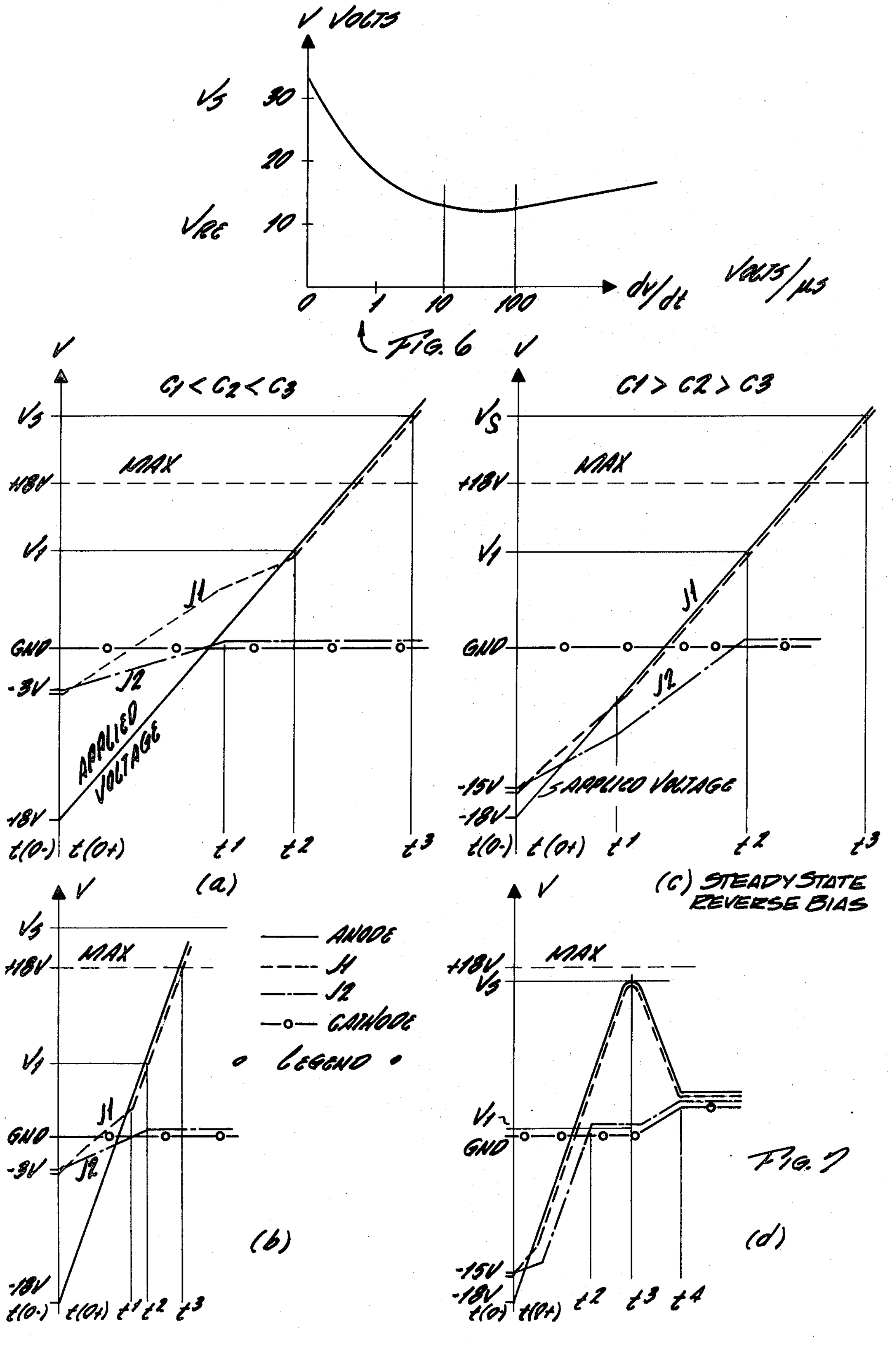
Figure 8:
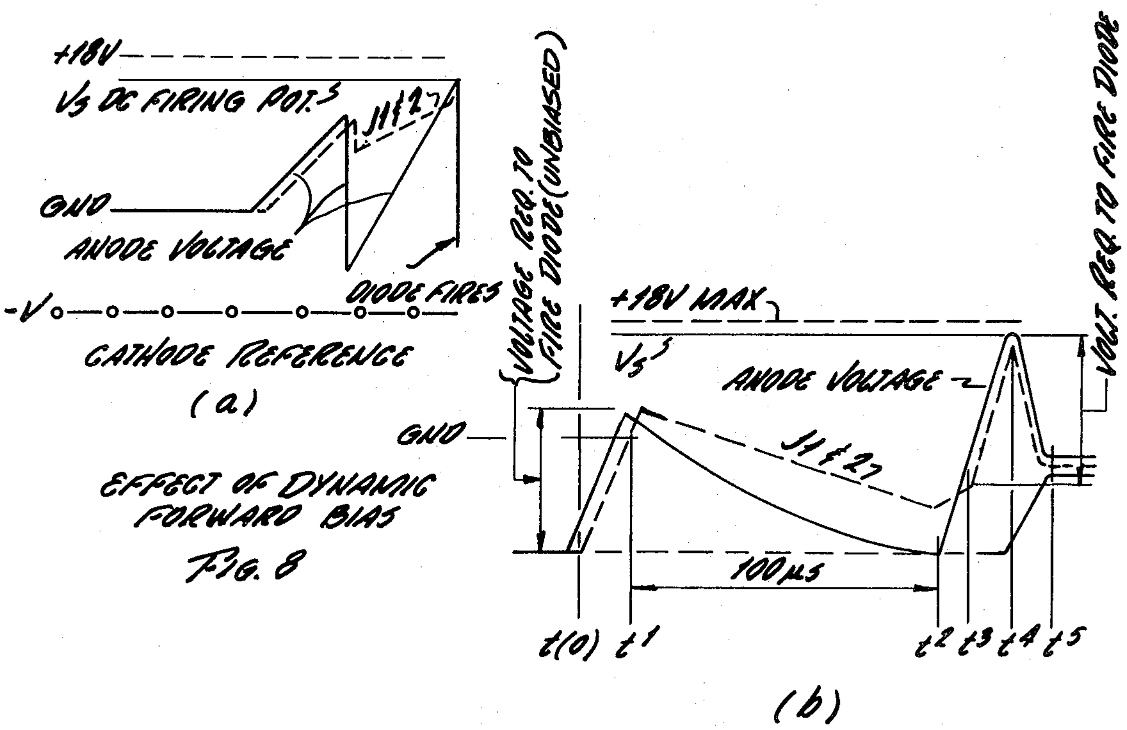
Figure 9:
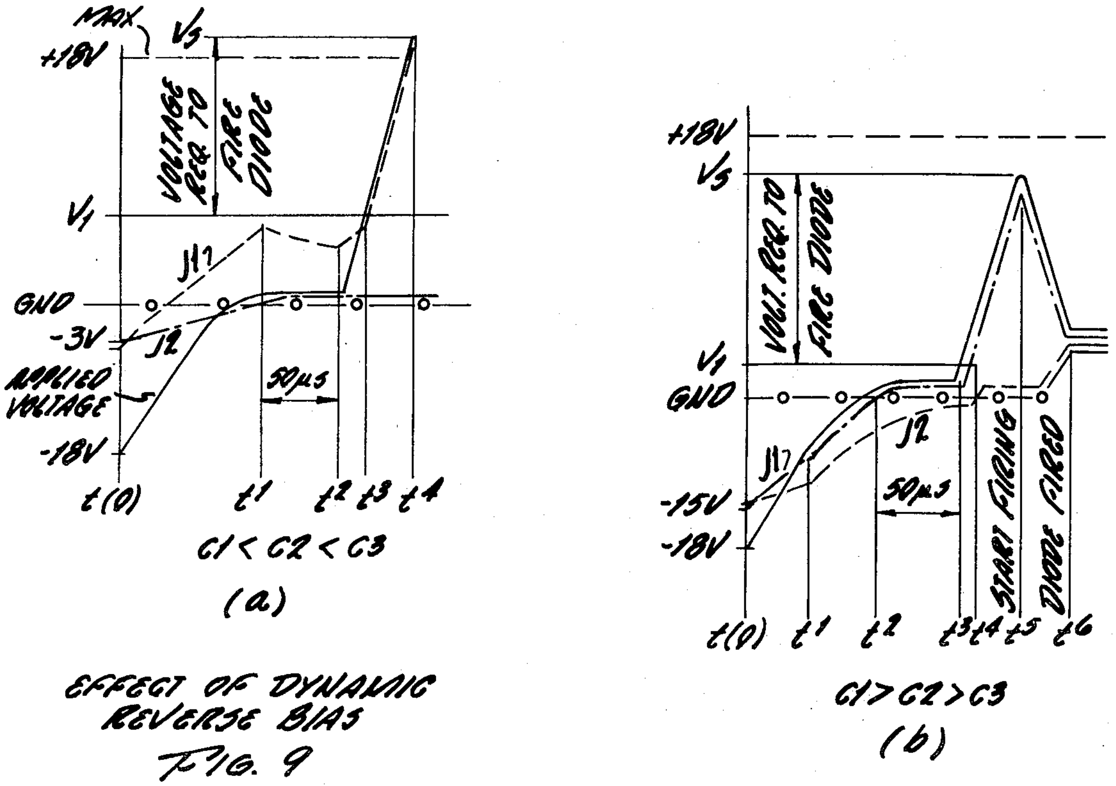
Figure 10:
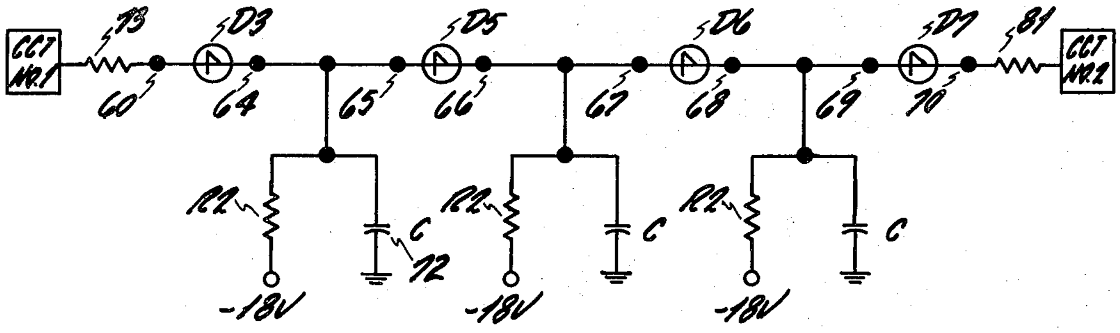
Figure 11:
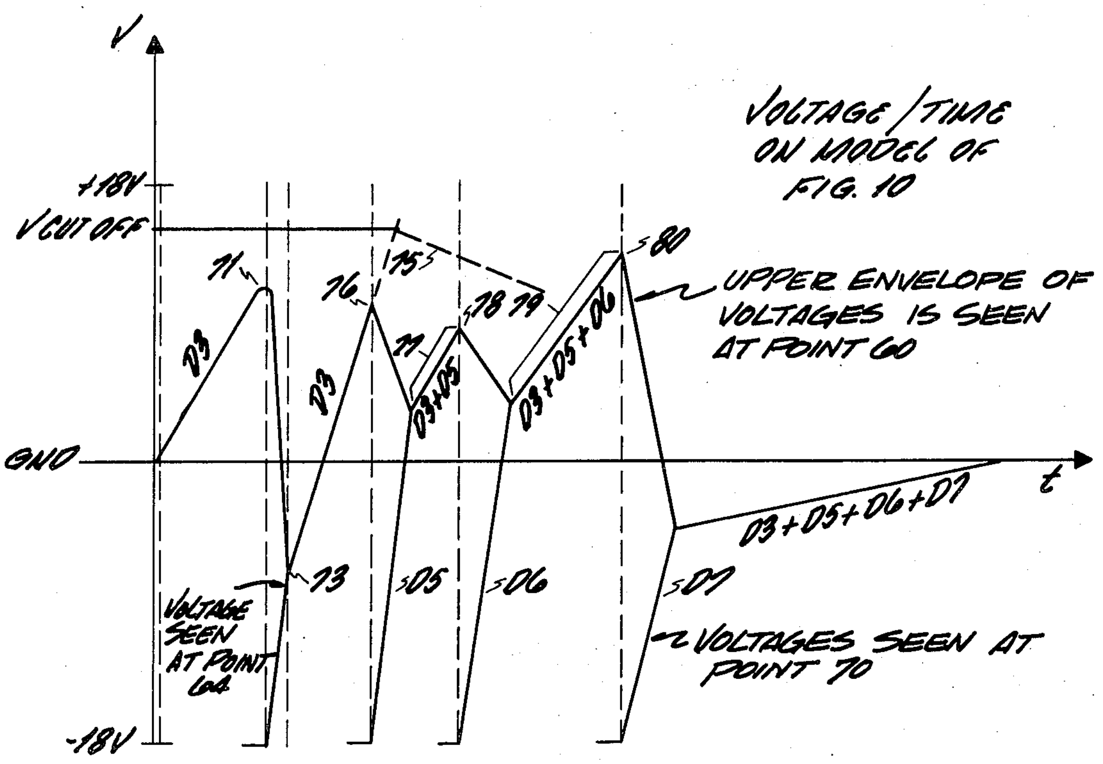
Figure 12:
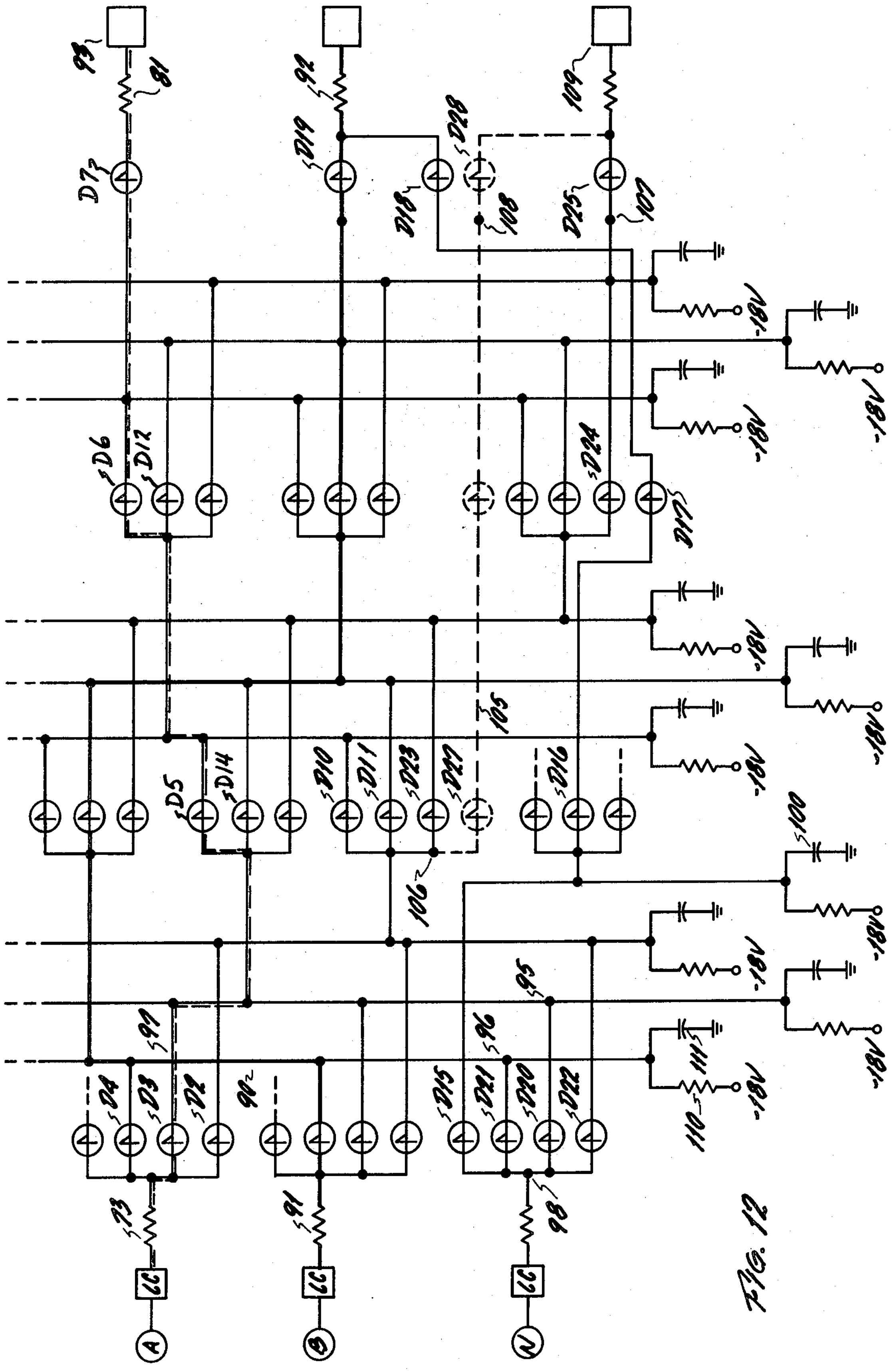
Figures 13, 14, 15:
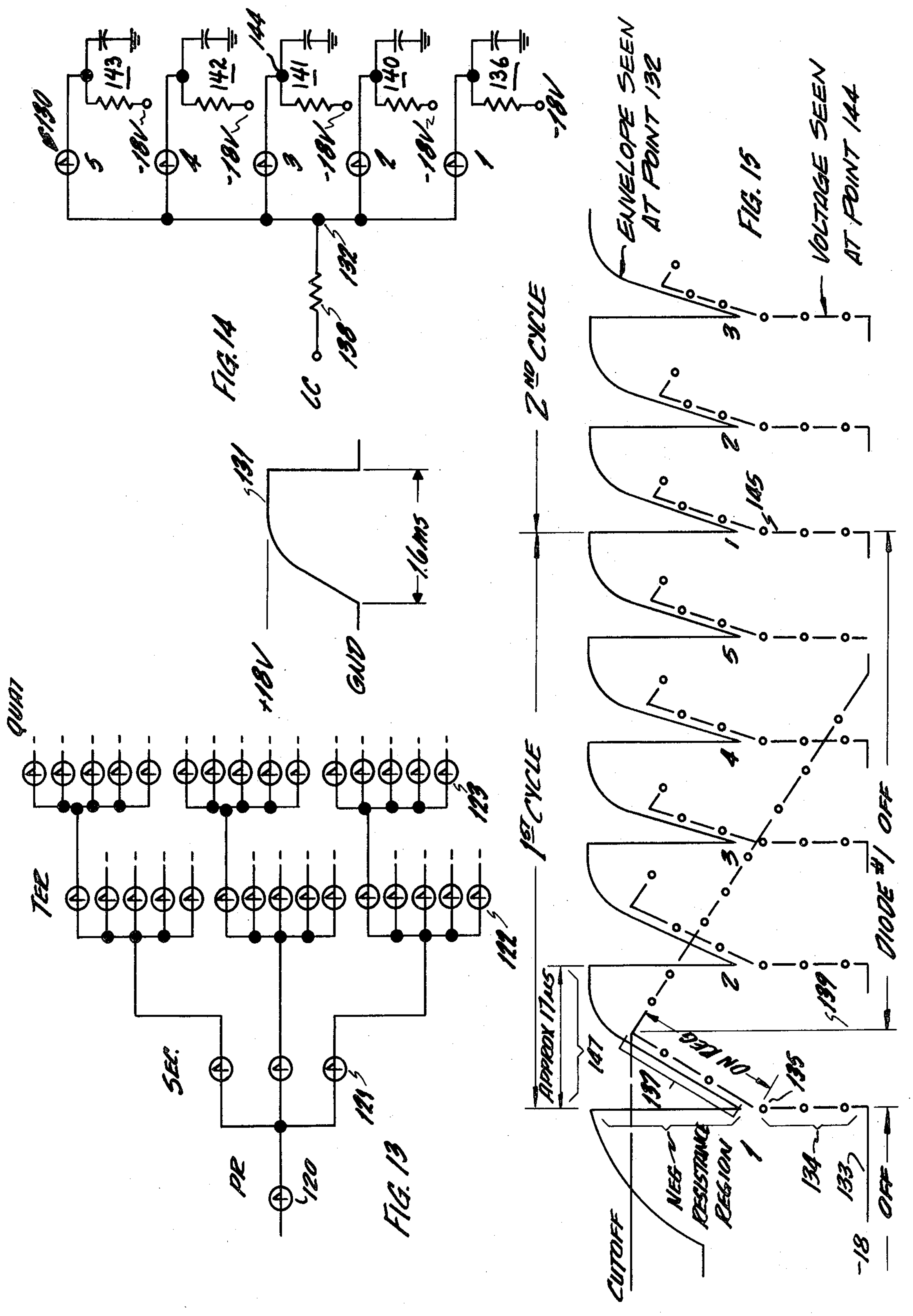
Figure 16:
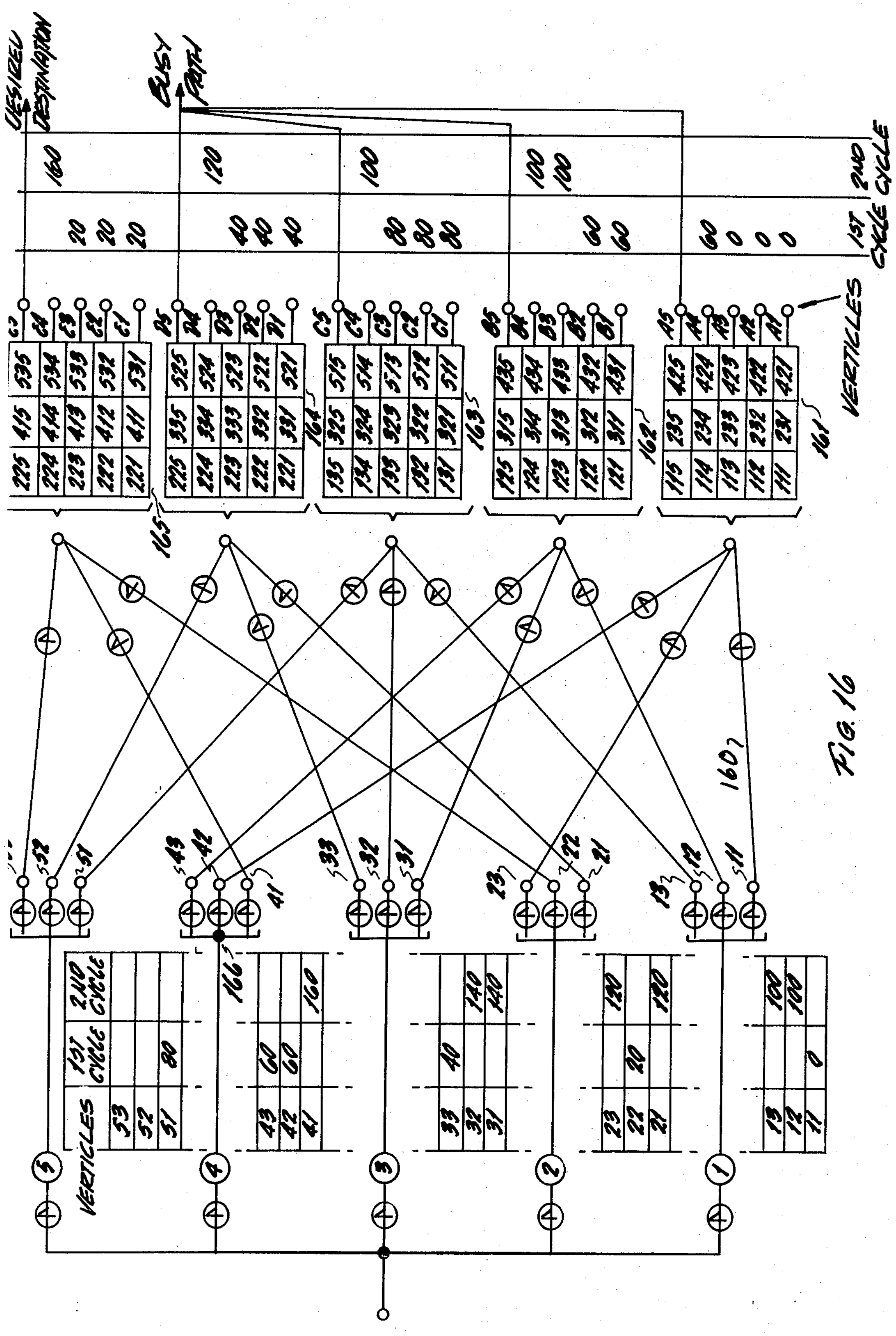
Figure 17:
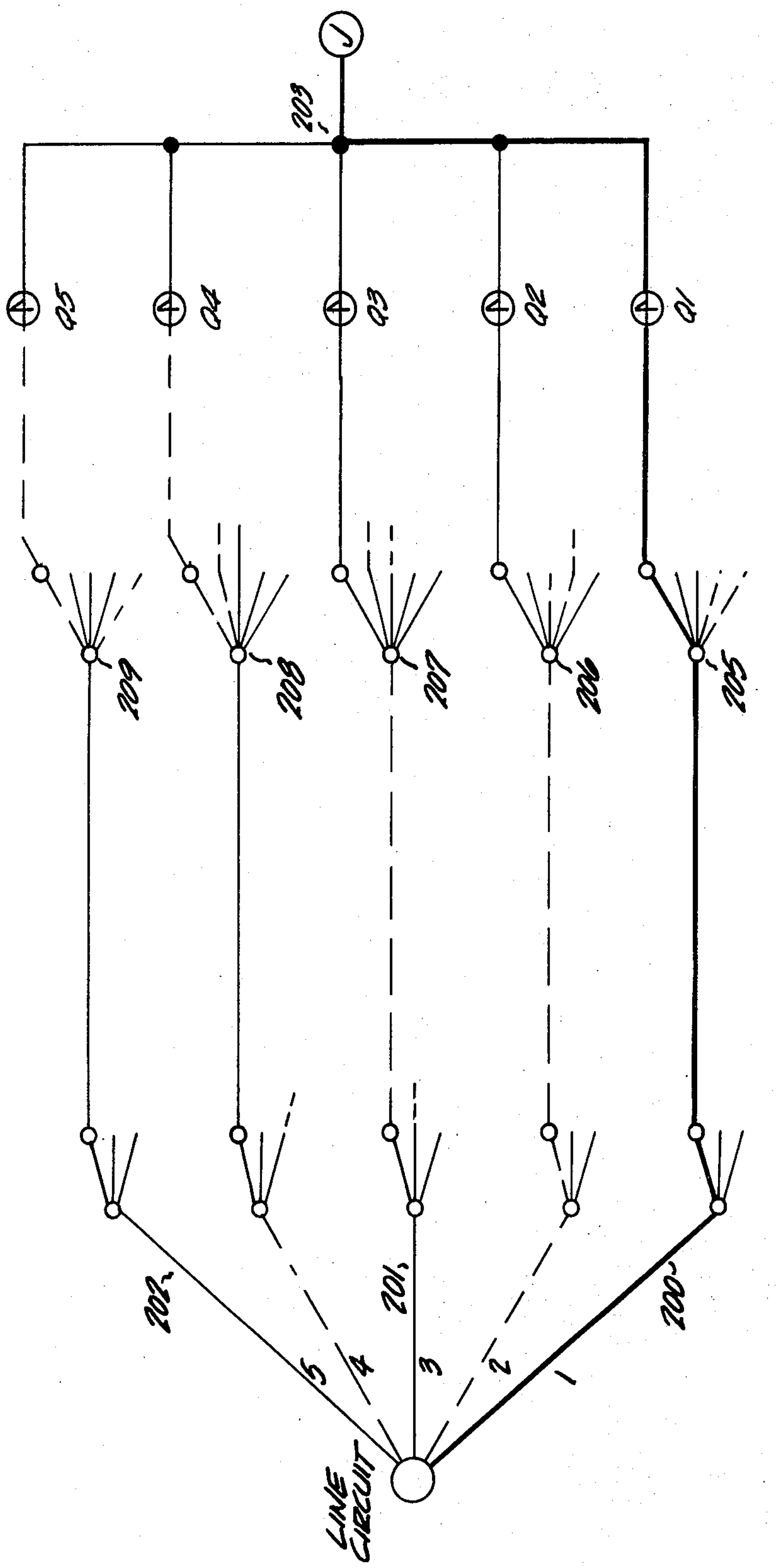
Figure 18:
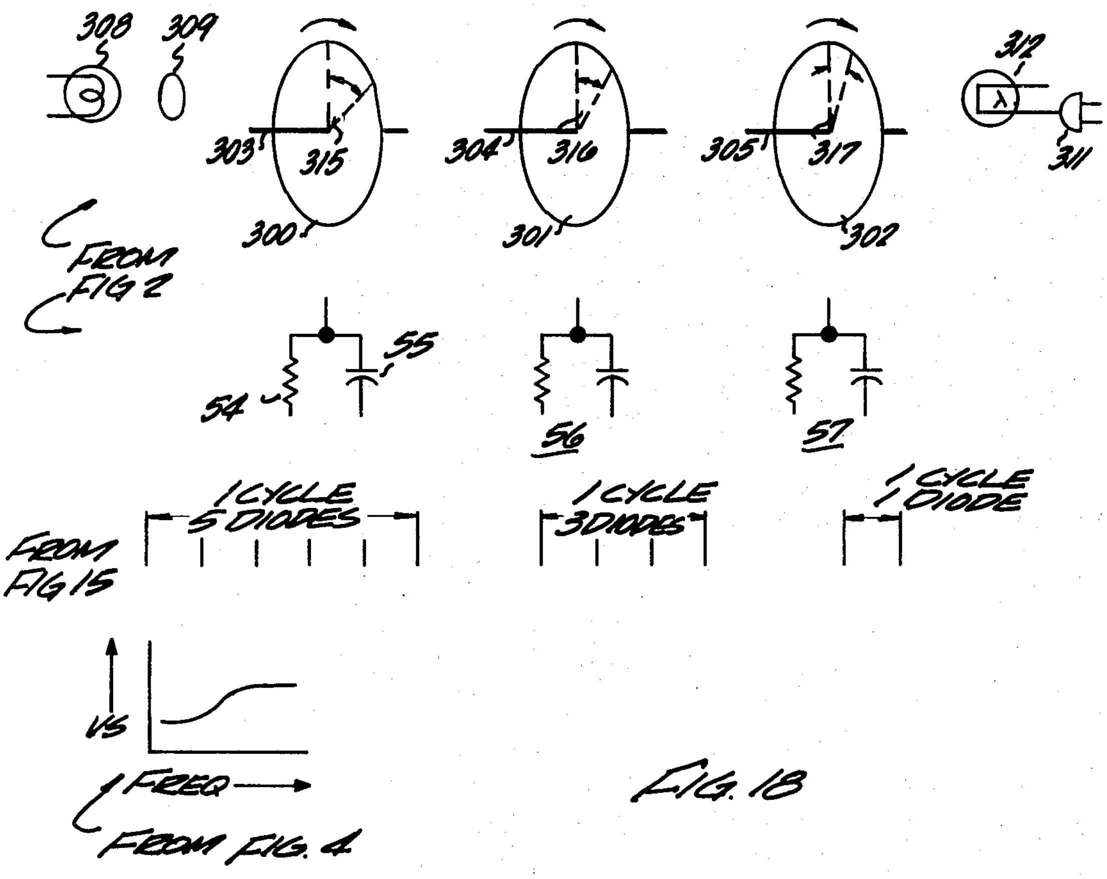

FIG. 5*a* shows a commonly used block diagram equivalent circuit for a PNPN diode. FIG. 5*b* shows an electronic extrapolation of the block diagram of FIG. 5*a*, and FIG. 5*c* shows a simplification of the extrapolated circuit of FIG. 5*b*;

FIG. 6 is a graph which plots firing voltage against the rise time of an applied firing pulse to show the so-called "rate effect" of a PNPN diode;

FIG. 7 shows the switching characteristics of a PNPN diode which has been exposed to a static condition reverse bias, FIG. 7*a*, 7*b* showing the case for a planar epitaxial diode placed in the circuit with one geometry, and FIGS. 7*c*, 7*d* showing the case when the geometry of the diode is reversed with FIGS. 7*b* and 7*d* showing how the diode characteristics change under dynamic biasing conditions where the diode firing time scale is collapsing;

FIG. 8 shows the effect of dynamic forward biasing, FIG. 8*a* showing how one of the primary diodes experiences a voltage change when a parallel connected diode fires, and FIG. 8*b* showing how the characteristics change after an unfired diode has been bombarded with a series of recurring firing pulses;

FIG. 9 shows the effects of dynamic reverse biasing with the planar epitaxial type of diode connected into the network with either of its two geometries;

FIG. 10 shows, by schematic circuit diagram, the single path through the matrices of FIG. 2, that is marked by heavily inked dashed lines;

FIG. 11 shows the voltage changes which occur on the switch path of FIG. 10 when each of the series connect diodes fires in a sequence from left to right;

FIG. 12 shows an idealized model network taken from FIG. 2 for laying a basis of understanding about how a dynamically tapered network may be constructed;

FIG. 13 schematically shows the fan-out pattern of diodes in an end-marked network which are seen from any given primary diode;

FIG. 14 shows the array of primary diodes which are cyclically scanned responsive to an end-marking;

FIG. 15 is a voltage graph which tells how the firing voltage changes while the diodes of FIG. 14 are scanned;

FIG. 16 is a table which explains how a dynamic tapering occurred under one exemplary set of circumstances;

FIG. 17 is another showing of the diode patter which fans out from an end-marking point, which patter shows how a natural tapering occurs responsive to the busy conditions which may exist in the network at any given time; and FIG. 18 is an analog of the network of FIG. 2 presented here to highlight some aspects of the invention which are explained by FIGS. 1–17.

Before entering into a description of the invention, per se, it may be well to review the manner in which a Porter matrix operates. Again, the "timed systematic search " which results in a "dynamically tapered" network might have application in different forms of end-marked networks. However, the preferred embodiment of my invention uses a Porter matrix; therefore, I will explain it in detail. Nevertheless, I will digress to mention other types of matrices, from time to time, in order to highlight the manner in which the invention solves the heavy current problems which have been cited in the literature.

FIG. 1 shows the block diagram of four cascaded stages here called "Primary, Secondary, Tertiary, and Quaternary". Each stage has its inlets connected via a number of crosspoints to the succeeding stages. If all of these crosspoints are allowed to fire, latch, and stay "on" in every one of these matrices throughout all four stages, the cumulative multiplication of current becomes an important design consideration. If the network is increased to five stages, the number of simultaneously turned on crosspoints becomes an even more important consideration. Therefore, it is desirable to provide some means for distributing the power requirements over an extended time period if this type of network is used.

From another viewpoint, one might consider some of the other end-marked matrices which have been designed in the past. These matrices have sometimes adopted a naive approach and merely attempted to increase the power handling capabilities of all power supplies and components until the current requirements are met. When this was done, the voltage rate of rise increased until the crosspoints experienced an electrical stress high enough to cause them to fire and break into busy paths. Certain other solutions have moved in the direction of matrix design which add a degree of sophistication that sometimes introduces other problems. Thus, a desirable approach is to engineer a trade off of characteristics which avoids break-in, retains simplicity, and yet insures reliable switching.

Heavily inked, vertical, dot-dashed lines divide FIG. 2 into four cascaded stages (here designated "primary", "secondary", "tertiary", and "quaternary"), which correspond to the boxes of FIG. 1. These two figures may be oriented by comparing the labels on the boxes of FIG. 1 with those at the bottom of FIG. 2. These four cascaded stages provide a switching array arranged to give automatic telephone switching service. Two exemplary subscriber lines A, B are connected to the inlets of the primary stage, here shown as a single matrix. Any number of line groups or primary matrices may be added. Also, the groups may be enlarged or reduced in size to include a greater or lesser number of lines. The switching technique used by the invention is not limited to four stages, however. It applies equally well to any convenient number of switching stages.

A number of control circuits 50 — such as links, registers, or other circuits — are connected to the network outlets. These circuits 50 control the calls which are extended through the network and provide any necessary or desirable call functions such as: dial tone, busy tone, conversation timing, or the like.

In the idle state, both ends of the matrix are normally marked with ground potential. To request a switching path through this network, a subscriber line circuit LC marks one end of the desired path with +18 volts and an allotted control circuit 50 marks the other end with −18 volts. For example, a calling subscriber at station A may remove a receiver or handset from a hook switch (not shown) and cause an associated line circuit LC to mark an inlet 51. A control circuit (Link N) may be allotted at that time to mark outlet 52 so that a switch path will be extended through the network in a one-way direction from the demanding line circuit to the allotted link circuit (e.g. the heavily inked, dashed line path extends from the marked line to the marked control circuits).

Each matrix includes first and second (or horizontal and vertical) multiples, two of which are shown in M1, M2 respectively. Any suitable number of vertical and horizontal multiples may be provided in any given matrix; in this case, the multiples in the successive stages are designated as 5×5, 3×5, 5×5, and 5×n, respectively. These multiples (which may be conductive buses on a printed circuit board) are arranged to provide a number of intersecting crosspoints. Electronic switches, preferably PNPN diodes (one of which is shown at D1) are connected across each crosspoint. Thus, when the crosspoint switch is turned "on", the intersecting multiples are electrically connected, and when the switch is turned "off", the intersecting multiples are electrically isolated from each other.

These electronic switches turn themselves "on" or fire when a voltage in excess of a "firing" potential is applied across their terminals. In greater detail, each of the vertical multiples is biased through an individually associated RC network such as resistor 54, capacitor 55 to a first or common reference potential E1. Therefore, a crosspoint (such as D4) fires when the intersecting horizontal multiple M1 is marked by a second potential which exceeds a firing potential relative to the idle vertical marking E1. After a crosspoint D4 fires, the marking potential on the horizontal multiple charges the capacitor 55 connected to the intersecting vertical multiple. When the capacitor charges sufficiently, a firing voltage appears on a horizontal multiple of the next cascaded matrix. Thus, the marking potential is passed on, stage-by-stage, to each succeeding cascaded matrix where the diodes fire in a similar manner.

Actually, the marked horizontal multiple M1 has many intersecting vertical multiples (as exemplified by the crosspoint diodes D1–D4 in the primary matrix of FIG. 2). Thus, if all vertical buses or multiples are marked in common by a single reference potential, all crosspoint diodes connected to the marked horizontal multiple M1 should theoretically fire simultaneously. This pre-supposes, however, that all diodes have exactly the same characteristics, a fact which in reality is almost never so. Actually, one diode (such as D4) will almost certainly fire first. Then, the common reference potential E1 on the vertical bus or multiple is applied through the fired diode D4 to lower the marking potential on the horizontal multiple M1 while the associated capacitor 55 charges. This lowered potential prevents the other primary diodes D1–D3, connected to the horizontal multiple M1, from firing until after the fired diode D4 turns off.

The end-marking is a firing pulse which provides a charging current through the fired diode D4 to the capacitor 55. This current holds the diode D4 "on". If the charging current is replaced by a holding current before the rising voltage reaches "cut off" point, there is a completed path from the demanding subscriber line to an allotted link. This holding current keeps the fired diode "on". If the holding current does not appear, after the capacitor 55 charges, the diode D4 starves for want of current and switches "off". After the diode D4 switches "off", the potential of the charge stored on capacitor 55 is a reverse bias potential which holds the diode D4 "off" momentarily to allow another diode (such as D2) connected to the end-marked horizontal multiple M1 to switch "on". Later, the charge drains off the capacitor 55 through the resistor 54, thereby removing the reverse bias from the diode D4. Thus, diodes switch "on" and "off" in a random manner until a self-seeking path finds its way through the cascaded matrices. All of this is explained in detail in the Porter patent.

Upon reflection, it will be apparent that the self-seeking path may include many combinations of turned-on diodes which are widely scattered throughout the cascaded matrices. In view of the very randomness of the diode selection, many diode firings will be useless because they are not coordinated with other firings.

An important point to be noted here is that each succeeding stage in the network operates under the timing control of an RC network as at 56, 57. The last of the stages does not require such a timing control because it is end-marked by a selected one of the control circuits. For present purposes, the function of each RC network is essentially the same as that described above.

In keeping with one aspect of the invention, the time constants of these RC networks are selected for each succeeding stage to insure a complete search over all available crosspoints. The frequency or oscillation characteristics resulting from these time constants provide a timed, systematic, opportunity for every crosspoint to see every other crosspoint. With a general understanding of the matrix, per se, the manner in which this systematic search occurs may become more apparent by a review of how the crosspoints should operate. By way of example, this review begins with a description of a PNPN diode, which is a preferred electronic switch.

CROSSPOINT

Figure 4:
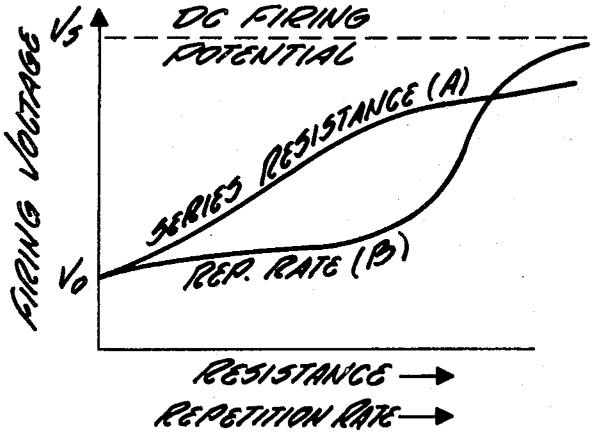
FIG. 4 is a graph which shows how the threshold of the firing voltage of an unfired diode may be raised by adding a series resistance or by increasing the frequency at which firing pulses are applied.

Each matrix is a specially arranged array of crosspoint devices, preferably PNPN silicon diode devices, sometimes also called 4-layer diodes. Since this device is well known, a very little additional comments are required to describe its more common characteristics. However, for the sake of completeness, some of the "-well-known" characteristics are:

a. The PNPN diode is characterized by three states or regions of conductivity (FIG. 3): Region I is an "off" or high impedance region, characterized by high voltage and low current. Region II is a transient or negative resistance region during which both current and voltage are in a state of change. Region III is an "on" or low impedance region characterized by low voltage and high current. The diode fires or passes from Region I to Region II when a sufficiently large voltage $V_s$ is applied across the diode terminals. As long as current does not fall below a holding level $I_h$, the diode remains "on" and in Region III. This summarization of that which is normally considered the DC characteristics of a PNPN diode is shown by the well known curve in FIG. 3.

b. In general, and under normal circuit applications, the PNPN diode parameters change slightly with temperature variations so that switching voltage and holding current go up as temperature decreases and vice versa.

c. The PNPN diode changes its switching characteristics as a function of changes in either the series resistance of associated circuits or the repetition rate at which pulses are applied to it. In general, the diode tends to fire at higher voltages as either the series resistance or the repetition rate of firing pulses increase without the diode actually firing, as shown in FIG. 4.

In carrying out the invention, full use is made of the "rate effect" firing characteristics of PNPN diodes. The term "rate effect" describes the characteristics of a PNPN diode which cause it to fire at a relatively high-voltage when a potential applied across it rises slowly and at a relatively low-voltage when the applied potential rises fast. Sometimes, this rise time is also called the "*dv/dt*"of the applied voltage.

Figure 5:
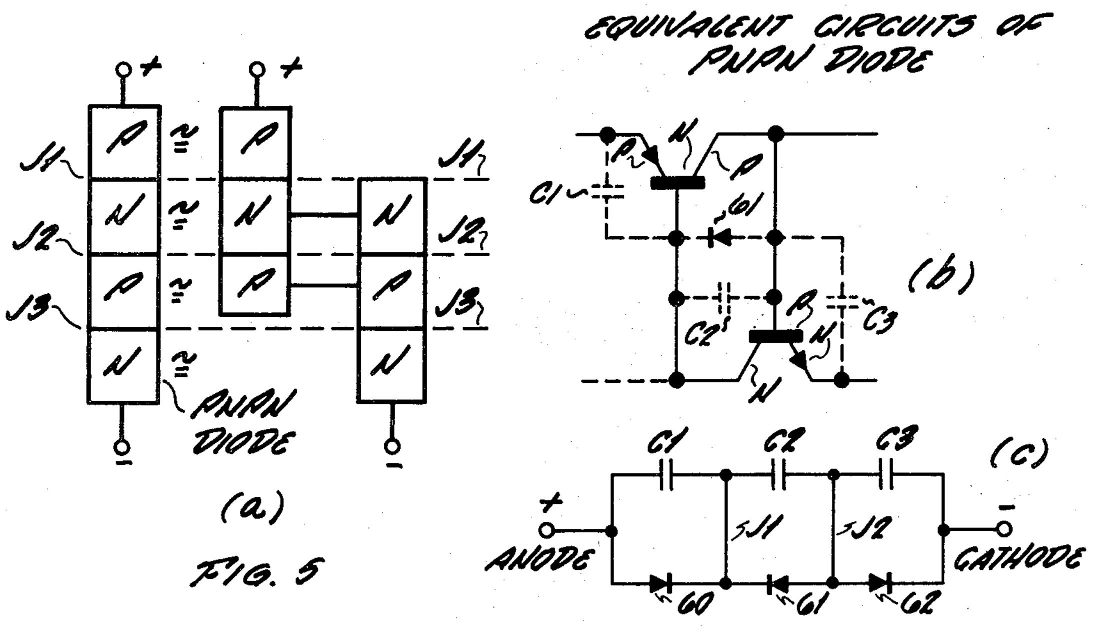

FIG. 5 depicts simplified equivalent circuits of a PNPN diode. These circuits are only approximations designed to highlight certain aspects of a PNPN diode; I do not represent them as completely accurate in every detail for all aspects of PNPN diodes.

FIG. 5*a*, on the left, shows four cascaded semiconductive layers, each layer being reversed in polarity with respect to the adjoining layers. Early diodes actually looked like this drawing. The newer planar epitaxial types of diodes have a different geometry, but the principle is the same. The (+) potential is applied to the outside "P" layer, and the (−) potential is applied to the outside "N" layer (called the "cathode"). Each layer is separated from the adjoining layers by a "junction", here marked J1, J2, J3. A depletion region forms naturally at each junction, the depletion region acting as a capacitor. This depletion region is well known to semiconductor physicists.

With a little imagination, one can see that the left hand block diagram of a PNPN diode may be redrawn into an equivalent circuit (the right hand side of FIG. 5*a*) which includes a PNP and an NPN transistor with connections as shown in FIG. 5*a*. The actual circuit connections of the equivalent circuit (FIG. 5*a*) very closely resemble the simplified circuit in FIG. 5*b*. The capacitances shown by dotted lines in FIG. 5*b* are the junction capacitances.

Another equivalent circuit (FIG. 5*c*) shows the junction capacitances of the diode as three series connected capacitors, each of which is parallel with a diode. The polarity connections of the diodes may be found from inspection, i.e. diode 60 is a PN diode as is indicated by the first two letters of the diode name "PNPN"; diode 61 is an NP diode represented by the second two letters "NP", the PN diode 62 is represented by the last two letters "NP"; Thus, the left hand most junction J1 separates PN layers which form a diode (with the P-layer connected to (+) potential), in parallel with a junction capacitance C1. Likewise, junction J2 separates two layers forming an NP diode with a parallel junction capacitance C2, and junction J3 separates two layers forming a PN diode (with the N-layer connected to (+) potential) in parallel with a junction capacitor C3. The center diode 61 is floating between the two outside diodes 60, 62 and poled in a direction which is reversed with respect to the direction in which the outside diodes are poled.

To switch a PNPN diode from Region I to Region III, two conditions must be met simultaneously: (1) a switching current must be supplied to capacitor $C_2$ with a given level $I_s$, and (2) a switching voltage applied across the outside diode terminals with the indicated polarity and at a given potential $V_s$. Either of these two conditions may play a more predominant roll as a function of variations in the rate of change of the applied voltage. Thus, when the applied voltage rises at slow rates, $V_s$ is a more predominant factor than the current $I_s$. As the applied voltage raises at an increased rate, the current $I_s$ plays a more and more important roll in the switching.

To illustrate the effects of the switching voltage and current ($V_s$, $I_s$) let us consider the following three cases with no bias on the diode:

a. The firing voltage is applied with a slow rate of rise (very close to the DC condition)

If the voltage applied across the diode terminals is slowly brought to a potential which is just below its DC firing or switching potential $V_s$, the diode can sit for hours and still remain in its "off" state. All that would be required to turn such a forwardly biased diode "on", at a slow rate of change, is an additional voltage change, possibly in order of a fraction of a volt. Prior to turn on, hardly any current [except possibly leakage current (of the order $10^{-9}$ amps)] flows through the device. Therefore, the firing or switching voltage $V_s$ is the most predominant factor under this condition.

b. Fast Rate of Voltage Rise (10 V/$\mu$s)

If, for example, capacitor C2 (FIG. 5c) can pass 10 $\mu$a in a unit time period and if the required switching current $I_s$ is in the order of 20$\mu$a, the switching current builds up to the switching level $I_s$ during two time unit periods. If a time unit period is of the order of 1 microsecond and if the voltage applied across the diode rises during the two time unit periods to 20 V, and this is fast enough to fire the diode on the "rate effect, " it will fire at 20 V which is well below the slow rising or DC firing potential $V_s$. Here, the switching current $I_s$ plays the most important role. A stylized "rate effect" response curve of a PNPN diode is plotted in FIG. 6.

c. Very Fast Rate of Voltage Rise

When the voltage applied across the PNPN diode terminals raises at a very fast rate of rise, the most important roll is played by yet another factor, which does not have any appreciable significance at low and moderate rates of rise. This is the time, T, required to inject charge carriers into the base layer of the PNPN diode. Typically, the time T is in order $10^{-7}$ sec. Consider a firing voltage which rises at the rate of 100 V/$\mu$s, by way of example. The first 10 volts of rise (0.1 $\mu$s) are required to inject charge carriers and thereby overcome the time lag effect T. Only after the elapse of this initial time period (0.1 $\mu$s) can the actual switching begin to be attempted. The curve of FIG. 6 begins to swing upward at the right hand end to point up the effect Next, consider how the firing characteristics are changed if a PNPN diode is forwardly biased in a steady state D.C. condition before an attempt is made to fire it. If there is no steady state forward D.C. bias before an attempt is made to fire the diode, a fast rising voltage [having (say 10 V/$\mu$s) rise] actually fires the diode at a lower "rate effect" potential since there is no delay in switching the outer two equivalent diodes 60, 62, and the current $I_s$ readily flows through the capacitor $C_2$. However, because of a forward bias, the diode fires at a potential which is higher than the firing potential of an unbiased diode regardless of the rate at which the applied firing voltage raises after the bias condition occurs.

The reason for this effect is apparent from an inspection of FIG. 5*c*. In the forward biased state, diode, equivalent outer diodes 60, 62 are biased in their conductive direction. Therefore, these diodes short circuit the junction capacitors $C_1$ and $C_3$. However, the center diode 61 is back biased and the floating inner capacitor $C_2$ is charged. The steady state forward D.C. bias increases the effective firing voltage since the applied pulse must be added to the biasing voltage on the center capacitor $C_2$ before an adequate current $I_s$ flows. This is fairly straightforward and easy to understand.

Returning to FIG. 2, one notes that historically (before the firing pulse appears) both terminals of a diode connected to an idle vertical are at ground potential. The terminals of a diode connected to a busy vertical are back biased at a steady D.C. level. Thus, there is an electrically induced difference between the diodes connected to idle and busy verticals. The induced difference is due to the charges stored on the junction capacitances and, therefore, is capacitive in nature.

The steady state reverse bias condition is easy to understand, but it may be difficult to see, initially, Briefly, if the diode is subjected to a reverse bias in a steady state condition before attempting to fire, the main effect is due to the junction capacitances within the diode—somewhat as explained above in connection with forward biasing. However, in this case, the center junction 62 is short circuited by diode 61. The two outer diodes 60, 62 are back biased; therefore, capacitances 61 and 63 are charged with a polarity which maintains the reverse bias on the diodes 60, 62. When a firing pulse is applied to the PNPN diode. the charges on capacitances $C_1$ and $C_3$ are redistributed. Thereafter, the capacitance $C_2$ may become charged in a forward direction as the internal diode polarity changes.

For a better understanding of reverse bias reference may be made to FIG. 7. All four graphs in FIG. 7 are read in the same manner. Each graph shows the voltage distribution at the four layers of a PNPN diode, when the diode is initially reverse biased. The legend on the drawing identifies the curves representing the voltages on the points marked "anode", "J1", "J2", and "-cathode" in FIG. 5*c*. The lines show how the voltage at these points change as a function of time while the diodes are firing.

FIGS. 7*a*, *c*, show how these voltage distributions change when the firing voltage is applied at a relative slow rate of rise. FIGS. 7*b*, *d* show how these same voltage distributions are affected when the firing voltage rises at a faster rate. FIG. 7d has been drawn under an assumption that the diode begins to fire the time $t_3$ and, further, that an avalanche condition continues until time $t_4$, when the diode is switched on, as shown by the collapse of the voltage graph of FIG. 7*d*.

The relative values of the junction capacitances $C_1$, $C_n$ and $C_3$ have a significant effect upon the diode operations. The differences in capacitances are due to the geometry of a planar epitaxial PNPN diode where one outside junction is much larger than the other outside junction, the center junction being an intermediate size. Thus, the equivalent capacitors (FIG. 5c) have three sizes. The diode could be manufactured with either $C_1<C_2<C_3$ or $C_1>C_2>C_3$. The first case ($C_1<C_2<C_3$) is the one shown in FIGS. 7a, b. FIGS. 7c, d show the second case where $C_1>C_2>C_3$.

Next to be described is the significance and manner of reading FIG. 7a — the remaining graphs are read in the same manner. By inspection of FIG. 5c, it is seen that the equivalent diodes 60 and 62 are back biased by the initial distribution of charge carriers so that they are distributed across the depletion region to establish a relatively great voltage thereat. The polarity of the voltages on the center capacitor $C_2$ forwardly biases the equivalent diode 61; therefore, almost no charge is stored at the capacitor of the center junction. The graph of FIG. 7a shows these polarities at the time $t_o$.

The firing pulse begins at the time $t_o$ and the anode voltage moves positively toward the cathode voltage at some slope which is established by the rise time of the applied voltage. The voltages on the junctions J1, J2 cross each other just after time $t_o$. The voltage on the junction J2 crosses the voltage at the cathode at time $t_1$. Thereupon, the diode 62 is forwardly biased and clamped to ground. More current flows through the capacitances C1 and C2, causing the voltage line for junction J1 to change its slope.

As the applied voltage continues to go positive, there comes a time $t_2$ when the diode 60 becomes forwardly biased. Thereafter, the voltage at the junction J1 follows the anode potential. The true switching process can begin at time $t_2$ because the charge carriers are then distributed to give the internal diode polarities necessary for the firing process to begin. The voltage $V_1$ indicates the level of the applied voltage at the time when the internal polarities become properly oriented to start the firing process.

It may be recalled that only +18 volts are available from the power source and that the diode fires when the difference between $V_1$ and $V_s$ equals a firing potential for the diode in an unbiased condition. Looking at time $t_2$ in FIG. 7a, one sees that the diode will fire only after the voltage has raised from the level $V_1$ to the level $V_s$. However, since the power supply has the finite voltage limit of +18 volts, the applied voltage cannot rise beyond +18 V to become $V_s$.

The specific voltages shown on the vertical scales in FIG. 7 may be justified only by considering them as applicable to a specific diode type. For other diode types, other voltages would appear on the scales. Therefore, I present the following calculations to show how I arrived at the voltages given here. Then, the comparable voltages may be calculated in a similar manner for any diode types.

For this calculation, an assumption is made that $$C_1 1 = C_2/3 = C_3/5 \qquad (1)$$

which fairly well approximates presently available planar epitaxial PNPN diodes. Note that the center junction capacitor $C_2$ is shorted out because the diode 61 is forwardly biased. The voltage relationships across the diode is given by the formula:

$$V = V_{J1} + V_{J2} \qquad (2)$$

where: $V_{J1}$ = voltage at junction J1 and $V_{J2}$ = voltage at junction J2 (FIG. 5c) and $$x\ V_{J1} = Q/C_1\ ;\ V_{J2} = Q/C_3 = Q/(5C_1 \qquad (3)$$

Where $V_{J1}$ and $V_{J2}$ are respective voltage drops across capacitors $C_1$ and $C_3$.

From the Eqs (1), (2), and (3)

$$V_{J2} = V-(Q/C_1 \qquad (4)$$

$$V_{J1} = V-(Q/C_3 = Q/(5C_1) \qquad (5)$$

Since the ratio of $Q/C_3$ is a smaller quantity than the ratio of $Q/C_1$ in (4), $V_{J1}$ is much larger than $V_{J2}$.

Let us next assign exemplary numbers to the expressions (4) and (5): let $V$ = 18 V; $Q/C_1$ = 15 V and $Q/C_3$ = 3 V then:

$$V_{J1} = 15\ V$$

$V_{J2}$ = 3 V These voltages 15 V and 3 V are not given a polarity so that they will represent a general case.

Assume that everything else remains the same (which normally would not be quite true) except that the rate of firing voltage rise time is changed (FIG. 7b). The voltage scale remains the same but the time scale is shown as collapsing. The PNPN diode does not fire because the firing potential $V_s$ is still above the +18 volts available from the source (dashed line).

Next, using a similar analysis, assume the case where $C_1>C_{2a}>C_3$ and apply it to a practical situation. The voltages for this case (FIGS. 7c, d) are derived by calculations given above with reference to FIG. 7a except that here the $V_{J1}$ is 3 V and the $V_{J2}$ is 15 volts. Again, polarity is omitted in order to make a general statement.

In this case, there is a significant difference with respect to the voltage shown in FIG. 7a. At time $t_1$, diode 60 becomes forwardly biased so the curve $J_1$ coincides with the applied voltage; curve $J_2$ changes slope because more current becomes available through capacitor $C_2$. At time $t_2$, diode 62 becomes forward biased, and the "true" switching process starts at this moment. On the slow rising time scale of FIG. 7c, the diode does not fire because voltage is limited by the source at +18 volts and the voltage would have to rise to the level $V_s$ in order to fire.

As the rate of applied voltage increases and the time scale begins to collapse (FIG. 7d), there is an applied rate above which it may be possible that a reverse biased PNPN diode will fire and break into a busy vertical since the switching voltage difference (i.e. $V_s-V_1$) falls below the potential level +18 V available from the source of voltage. Therefore, the voltage distribution collapses after the diode fires at time $t_4$.

This discussion of the two diode characteristics, made possible by reversing the geometry of a planar epitaxial diode, demonstrates that PNPN diodes may "-break-in" on busy connections when $C_1>C_2>C_3$, but not when $C_1<C_2<C_3$.

Next to be considered is the case (FIG. 8) of a forward dynamic biasing effect which occurs when a PNPN diode is momentarily exposed to a high forward bias potential which is not sufficient to fire it. With the matrix of FIG. 2, this type of biasing may occur under two conditions — one is in the primary stage and the other is in the secondary and tertiary stages. FIG. 8*a* shows the response of a diode in a primary stage initially biased. If a forcing voltage is thereafter superimposed on the biasing voltage and then suddenly removed before the diode has a chance to fire, the charge on capacitor $C_2$ (FIG. 5*c*) is effectively trapped since both outside diodes 60, 62 are back biased, and they present an impedance in the megohms range. This is shown by the dashed line labeled $J_1$ and $J_2$ in FIG. 8*a*. If the forcing voltage raises at a moderate speed (say 10 V/ $\mu$s), the "rate effect" is effectively canceled. Stated another way, the diode tends to fire at its DC firing potential after it has been exposed to a forward bias voltage, as evidenced by the second peak in FIG. 8*a*. Therefore, recurring pulses having a voltage characteristic adequate to fire an unbiased diode at the "rate" may be applied without firing the diode. From FIG. 4, the voltage at which a diode can fire raises as a function of the pulse repetition rate of the applied pulses.

The diode has this repetition rate dynamic biasing characteristic because an effective switching process does not take place unless diode 60 is forwardly biased and unless a finite time elapses between pulses to disperse the charge trapped on capacitor $C_2$. Switching current passes through capacitor $C_2$ only after such charge has dissipated. If, during this time, after capacitor $C_2$ begins to conduct, the forcing voltage attains a value close to the DC firing voltage, the diode fires. The voltage distributions covering this case are shown in FIG. 8*a*.

The other dynamic biasing case is where the diode is initially in its unbiased state — a condition which is most likely to occur in the secondary and tertiary matrices. Assume that recurring pulses are applied across the diode with a reasonably fast rising voltage (say 50 V/$\mu$s). The pulse voltage is not sufficient to fire the diode, and it is applied, removed, and then reapplied 100 $\mu$s later. Assume also that the amplitude of the first pulse is not sufficient to fire the diode, but the amplitude of the reapplied voltage would cause the PNPN diode to fire if it had been applied on the initial attempt, (FIG. 8*b*). During time $t_{0-}$, diode 60 becomes forwardly biased. The voltage at junction $J_1$ and $J_2$ follows the voltage level at the anode of the PNPN diode. At time $t_1$, the forcing voltage is removed, and the anode voltage decays exponentially through the external circuit's resistance (e.g. 110, FIG. 2).

If the forcing voltage had been applied with just a little greater amplitude, the diode would have fired close to time $t_1$. However, with the assumptions here made, the diode did not fire and the voltage at junction $J_1$ decays from time $t_1$ when the firing voltage is removed until time $t_2$ when the voltage is reapplied, but at a slower rate due to the higher internal impedance of the diode. At time $t_2$, the forcing voltage is reapplied with a higher amplitude. At time $t_3$, the diode 60 becomes forwardly biased. Only then can the effective switching process begin to take place. Note that the entire voltage rise from time $t_2$ to time $t_3$ was used up by the process of redistributing charge carriers in the PNPN diode and, therefore, this voltage must be subtracted from the applied voltage. The diode will fire only if the voltage which remains in the firing pulse has an amplitude, relative to the voltage at time $t_2$, which is equal to the firing voltage required to fire the diode on the first try. If so, the PNPN diode fires at time $t_4$, here shown just below the available voltage limit. This firing potential is higher than the normal "rate effect" voltage for a 50 V/ $\mu$s waveform due to voltage superposition and is higher than the unbiased level by an amount equal to the charge level trapped during time $t_1 - t_1$, as it decayed during time $t_1$ $-$ $_2$, plus the unbiased switching level.

The two dynamic bias cases (FIGS. 8*a*, *b*) just discussed are directly applicable to the dynamic conditions which normally exist in the matrix of FIG. 2 during the switching process. This discussion demonstrates that it is necessary to select the right diode characteristics so that a diode may meet the static requirements and yet not fail under dynamic conditions which normally occur in the matrix. Also, the values of diode capacitances play a significant roll in reducing or increasing the effect of the "memory" which prevents break-in on busy paths.

The following conditions are experienced primarily by the quaternary or terminal diodes which connect to the control circuits 50 (FIG. 2). The two cases presented in FIGS. 9*a*, *b* are $C_1<C_2<C_3$ and $C_1>C_2>C_3$ which occur when a planar epitaxial diode is made for use in either of its two geometrical configurations. An inspection of the curves in FIG. 9 shows that the case is very similar to the reverse biased steady state condition. Therefore, it will not be discussed again in detail; however, it should be pointed out that although the cases are very similar, they cover two diametrically opposite matrix dynamic situations. (FIG. 9 shows the switching requirement). From the standpoint of "-break-ins" on busy connections, it appears that the geometry of the planar epitaxial diode connections is most satisfactory when $C_1<C_2<C_3$. However, from the standpoint of switching the more desirable geometry of diode connections occurs when $C_1>C_2>C_3$. Regardless of the geometry choice of diode connections, one thing is more than certain, great care must be exercised to meet the two opposite requirements.

Briefly, FIG. 9*a* shows that the applied voltage may raise to the maximum voltage (+18) available from the power source. The first equivalent diode 60 is forward biased at time $t_1$, the third equivalent diode 62 at time $t_2$. The junction voltage, at J1, crosses the applied voltage at time $t_3$. Thereafter, the PNPN diode must experience a voltage rise equal to a firing voltage before it will fire. Since the power supply limit of 30 18 V is less than a firing voltage, the PNPN diode does not fire.

In the case of FIG. 9*b*, the voltage can rise to a firing potential with respect to voltage $V_1$.

In both graphs of FIG. 8, the times $t_2$ and $t_3$ are very close together because the voltage rises very fast owing to the low impedance seen through the pertinent vertical bus capacitor. The downward slopes and curves in the voltage lines are explained by the decays on the junction capacitances.

The points to be noted from this discussion of crosspoint characteristics is that the PNPN diode is, in general, an excellent crosspoint device. No doubt other crosspoint devices will be found which will be an improvement over the presently available PNPN diodes.

The different electrical and environmental conditions that the matrix normally experiences has a considerable influence upon the characteristics of the devices which may be used in the matrix. This points out the difficulty which occurs when the diode characteristics are selected. However, it also points the direction for crosspoint improvements. Therefore, I do not limit the application of my invention to the presently available PNPN diodes; any suitable devices may be used in my matrix.

SWITCH PATH

FIG. 10 shows a somewhat idealized model of a typical path which may be established through the four-stage matrix of FIG. 2. This could be the path shown in FIG. 2 by dashed lines. The path is described as a "-model" because its voltage curve (FIG. 11) is idealized. The resistors 73, 81 at the ends of the path are shown for DC considerations only, they are bypassed for the AC speech signals in order to minimize transmission loss. The requirement is to establish a low impedance path between circuit No. 1 (which could be the subscriber A line circuit and circuit No. 2 (which could be the Link No. 1). If an unbalanced, ground return path is inadequate for any given purpose, two entirely separate paths may be fired to provide a balanced transmission characteristic. The model (FIG. 10) switch path operates this way. Assume that a +18 V is the maximum voltage available from circuit No. 1 and that a −18 V is the maximum voltage available from circuit No. 2. Assume further that all of the PNPN diodes D3, D5, D6, D7 are in their "off" state before the end markings appear. All of the points 64–70 are at the idle bus or ground potential applied to the vertical bus through the RC biasing networks.

FIG. 11 shows a graph of voltage V plotted against time with respect to the path of FIG. 9. The time scale begins when the circuit No. 1 and NO. 2 start to change their matrix marking voltage from ground to the end-marking voltages of +18 V and −18 V, respectively. The end marking rises from ground toward +18 V and −18 V, respectively, at a certain rate of voltage rise. Effectively, the voltage increases across diode D3 in a forward bias direction, while the voltage changes across diode D7 from a reversely biased condition toward an unbiased condition. At a certain voltage (+ 18V>$V_x$>ground), the diode D3 fires, (point 71, FIG. 11). Momentarily, diode D3 sees a low impedance presented by the capacitor 72. The result is that the whole voltage drop appears across the resistor 73. At the same time, a substantially large current charges capacitor 72 to approximately the same voltage that diode D3 experienced before firing, the voltage rise time being fast enough to fire diode D5 on a "rate effect".

If diode D5 is not fired, diode D3 reaches its minimum holding current and turns off. At this instant of time, (dashed line curve 75 of FIG. 11), the voltage begins to fall at the point 64, and the charge on the junction capacitances begin to redistribute themselves.

If the diode D5 fires (solid line of FIG. 11) it is because the charging current into the capacitor 72 causes the potential at point 64 to rise rapidly. Diode D5 experiences a rapid change of voltage, which at the "rate effect", forces it to fire at the lower voltage 76. Both of the diodes D3 and D5 are now "on", which is evidenced by the common voltage curve 77 in FIG. 11. Because of the various dynamic conditions present in the network when the two diodes D3, D5 are on, the line 77 has a lower slope than the corresponding line between 73–76 when only one diode D3 is on. Once the diode D5 is fired, diode D6 is fired by a similar process (point 78) and three diodes are then "on" (the portion of the curve labeled 79).

Since diode D7 was originally reversed biased, it tends to fire at a higher potential 80 in accordance with the previous discussion of the dynamic biasing. All four diodes D3, D5, D6, D7 are now turned "on", and all intermediate points 64–70 quickly discharge through the resistor 81, shown by the curve D3+D5, D6—D7.

After the transient disturbances subside, the matrix tends to settle down to its steady state, governed solely by the external circuitry condition, and in particular, by resistors 73 and 81. Once all four diodes are conducting, the RC networks along the path have no further function. In effect, they could be disconnected without changing the operation of the PNPN diodes. This suggests that, in the "on" state, the PNPN diodes are effectively passive devices.

Break-In And Double Connections

From FIG. 2, it should be apparent how the model path of FIG. 10 may be expanded to become the configuration of FIG. 12. Assume that a path has already been established over the heavily inked line 90. The resistors 91 and 92 have a resistance which is much larger than the resistance of the fired PNPN diodes. Thus, we may neglect the IR drops across the diodes. The steady state potential at all points associated with the established path 90 is not too far from ground, but the busy vertical buses have a polarity which reversely biases all unfired PNPN diodes connected to them.

Suppose that another originating subscriber A places a call while path 90 is busy and that another control circuit 93 is assigned to serve the next call. It has so indicated by placing an end marking. The voltages applied at the opposite ends of this path are again +18 and −18 volts, respectively. The line circuit for station A is here shown with four diodes available to it, but immediately diode D4 is eliminated because it connects to a vertical included in the heavily inked path 90 which is busy. The diode D4 is reverse biased. Therefore, the firing voltage of diode D4 must meet the requirement that +18 V>$V_X$>−18, which is not available.

Assume that diode D2 is the first to fire and that it, in turn, causes diode D10 to fire. Neither of the diodes D11 nor D12 can fire now because each connects to the heavily inked busy path and they are under a permanent reverse biasing condition. The calling line circuit abandons this abortive route through diodes D2, D10 (which turn off). Then another primary diode, such as diode D3, fires because the +18 volt end marking remains in the line circuit. The diode D14 is connected to a busy path, and it cannot fire. Therefore, it is assumed that the diode D 5 fires, and thereafter the path over the heavily inked dashed line 97 is completed.

Let us next suppose that a third subscriber N places a call and that a +18 volt marking appears at the point 98 to request a switch path connection. Assume that diode D15 fires first. The various diodes fire in the following stages to advance the path through diodes D16 and D17 only to find that the attempt is in vain since it is assumed that the diode D19 has fired in the busy path 90. Therefore, diode D18 cannot fire, and this path must be dropped. The diodes D20, D21 obviously cannot fire since points 95, 96 are standing at the busy potential of a vertical bus forming part of a path which has been seized. Eventually, diode D22 must fire and after a busy testing at each stage, is should be apparent that path D23, D24, D25 is the only possible path which remains idle.

Upon reflection, it becomes quite apparent that when a particular vertical is in use, all diodes connected to and from the vertical are reverse biased, and therefore effectively incapacitated. Of course, this incapacitation is essential to the preventing of a break-in on a busy connection with a resulting dual connection. This matrix characteristic allows the matrix to scan itself for busy and idle conditions and avoids a use of separate busy, interrogation and selection circuits which are necessary in many switch trains. If only one of the adjacent diodes violate the non-firing requirement, there is a serious system failure wherein: (1) a double connection results (the least likely to occur), (2) both parties are released from their respective control equipment, or (3) one party connection is released and another party takes its place (the most likely to occur).

The matrix is very effective in securing the requirements which prevent break-in on busy paths. It is also very effective in preventing double connections within the fan-out field of diodes connected to the end marked point. To illustrate, assume that a fictitious path (shown in dashed lines 105) is added to the busy paths in the network at the time when subscriber N requests a connection. By firing the diode D22, a positive end-marking +18 volts is applied to the point 106. Suppose now that both of the diodes D23 and D27 fire simultaneously and that the firing progresses along two independent paths. A virtual race is now in progress. If diodes D28 and D25 have similar characteristics and further if signals of equal amplitudes simultaneously arrive at points 107, 108, one would naturally expect a double connection. Fortunately, however, this is almost the last thing which can happen because it is almost certain that only one of the diodes D25, D28 can fire first. In so firing, it causes the end-marking potential at 109 to change rapidly, thus preventing the other diode from being fired. Under the stringent and very unlikely assumptions made above, (i.e. all things in the matrix are equal) the reason why only one of the diodes D25 D28, fires cannot be found within the diodes D25 and D28, per se, but can be found in the dissimilarities of their independent paths.

With the above description in mind, one can now investigate the role played by each component. As previously noted, the RC networks could be disconnected after the switch path has been completed. Therefore, a vertical bus resistor (such as 110) is provided only to establish a pre-firing biasing potential. This resistance has a relatively high value so that the current available from the power supply and passing through the resistor is less than the holding current of the diode. Otherwise, a diode could latch and be held permanently through the resistor which, of course, is undesirable.

The capacitor such as 111 has a very important function during the switching as well as immediately after an unsuccessful firing. On firing, the path through the capacitor 111 forms an instantaneous low impedance for the just fired diode or diodes of the preceding stage. Thus, as the diodes turn on and off, the energy needed for firing is rapidly transported from stage to stage. Also, because of the rise time of the charge on the capacitor, the matrix diodes fire at the low rate effect voltages. After each unsuccessful attempt to fire, the capacitor 111 discharges through the resistor 110 during a relatively long time period. The resulting charge forms a momentary back bias which prevents the same diode from immediately firing again. This back bias, in turn, allows any other diodes which are connected in parallel with a just fired diode to have a chance to fire, thus causing a complete search for an idle path. The functions of the resistors such as 73 and 81 are two-fold. They must limit the current through the matrix, and yet insure a sufficient level of holding current. The values of the resistors 73 and 81 must also be chosen so that the voltage on a complete path is approximately ground potential to provide the matrix with the ability to resist dual connections.

The point to be noted here is that the various matrices may be timed by the component values which are selected. Further changes which result from the timing gives the network an entirely different mode of operation.

OPERATION OF A MULTI - STAGE MATRIX

The complexity of the larger multi-stage network is of a nature such that the simple relationships of the model discussed in connection with FIGS. 10 and 11 are applicable in only a very loose and approximate manner.

The literature suggests that the heavy current, sometimes called "fan-out" current, is the biggest stumbling block in the proper operation of a large multi-stage "uncontrolled"matrix. (It is through that the term "fan-out" current is not precise because all networks of this type have fields of crosspoints connected in "fan-out" patterns. Current always flows through some of the diodes in that pattern. Hence, the problem is not current in the fan-out, per se, it is the excessively heavy current when too many diodes turn on at the same time.)

For a better understanding of the heavy current, let us retrace parts of the foregoing description. FIG. 13 is an extrapolation of FIG. 13 were to turn on at the same time, and then stay on for an appreciable length of time, the end diodes (such as 120) and the associated power supply would have to supply the very high current which the literature has condemned as a "fan-out" current. This is the current which some literature has also described as requiring devices which are wasteful of crosspoint capability.

As can be seen, each primary diode such as 120 is connected to a different secondary matrix (one of which is shown at 121). Each of the secondary matrix diodes is connected to a separate fan-out pattern of diodes in a tertiary switch 122. Each tertiary switch diode is, in turn, connected to a different fan-out pattern of quaternary diodes 123. The excessive current occurs when more than an allowable number of these diodes turns on at the same time.

Many schemes for avoiding this heavy current have been described in the literature. For example, some inventors have used a computer to select the crosspoints which may be included in the desired path. Other inventors have tried various biasing or priming schemes. Still others have attempted to use automatically applied, self-effective marking networks for progressively selecting crosspoints one-at-a-time. Still other schemes have been suggested. Porter, and those who have followed his teachings and suggestions, have provided a network of crosspoints which did not turn on and stay on, but which turned on in a random manner and then turned off promptly if a path was not then completed through them. Thus, keeping the diodes turned on at any given time from remaining in an on condition.

In keeping with an aspect of this invention, I have provided a timed systematic search over the network such that every crosspoint may have at least one, and perhaps many opportunities to see every other available crosspoint. Yet, the number of diodes which may fire in the network does not get larger with added stages. In my network, I make effects to reduce the number of crosspoints which can turn on an the same time. As the number of stages increase, the effective size of the fan-out pattern of diodes which can turn on simultaneously is reduced at each stage. For convenience of expression, this network might be called a "dynamically tapered network".

The dynamically tapered network operates by virtue of energy transportation from stage to stage via vertical bus capacitors. Assuming that there is a power source of some finite limit, only a limited current of $x$ milliampers is available from the line circuit. The current available at any quaternary vertical of the diode field of one exemplary matrix is $x/15$. This relatively low level of current only needs to be sufficient to fire one of the quaternary diodes. The naive approach to current requirements (i.e. increasing the available current from the line circuit) is not a practical solution because the increase in current must be obtained by reducing the impedance of the line circuit, which, in turn, increases the rate of voltage rise at the RC network. A sharp increase in the voltage rise time increases the probability of break-in on busy paths.

"Pure" scanning is an inherent property of the primary stage, partially due to the diode characteristics, partially due to the RC networks connected to the primary-secondary verticals, and partially due to the rise time of the applied voltage. More particularly, FIG. 14 shows a typical line circuit with five associated primary diodes 130. A firing voltage having a slow rising waveform of the type shown at 131 is applied from the line circuit to end-mark the primary matrix at point 132. Assume that all PNPN diodes 130 have an identical firing voltage of about 30 volts, but that they vary from each other within manufacturing tolerances.

The firing order of the diodes 130 is immaterial. However, once an end-marking is applied, the diodes fire in some initial order. Thereafter, the diodes fire repeatedly responsive to the same end-marking. Once the firing order is established the first time during any end-marking, the firing order tends to maintain itself for the duration of the end-marking. Assume that the diodes 130 fire in a sequential, numerical order. That is diode no 1 fires first, then nos. 2, 3, 4, and 5, in order. FIG. 15 shows the effect on the applied end-marking waveform 131 which results from the diode firings. (The numerals 1, 2, 3 . . . 5, 1 . . . indicate the diode that fired to cause the dip of the curve). Diode No. 1 was originally in the "off" state before the end-marking firing pulse appeared. When the firing pulse is applied, the potential at the cathode rises rapidly from level 133 over the path 134 while the diode is turning on. The diode becomes fully saturated at knee 135, an instant which corresponds to the equalization of the cathode and anode potentials. After saturation, there is a pronounced change in the slope of the applied potential changes. Since the diode No. 1 is now turned "on", the external circuitry (not shown) in FIG. 14 for applying the end-marking in the line circuit and the RC network 136 govern the rate of voltage rise shown at 137.

As the end-marking voltage continues to rise, the potential difference across the series circuit including resistor 138 and the diode No. 1 becomes a smaller and smaller. Eventually, the voltage difference will become such that $$I_h \,/\, \text{diode No. 1} > (\text{E available} - \text{E cathode})/R_{138}$$

When this happens (point 139 on the curve of FIG. 15), the primary diode No. 1 turns off and stays off for at least 50 $\mu s$ (in this exemplary case) because of the slow exponential decay of the voltage at the cathode of diode No. 1 due to the RC timing of the network 136.

In the same manner, each of the diodes Nos. 2, 3, 4, and 5 fires, in turn. After each diode has fired and turned off, it stays inhibited for approximately the same length of time because each of the RC networks 140–143 has the same circuit values. After the cycle is finished and each of the diodes Nos. 1–5 has turned on and off, the diode No. 1 is again ready to fire since the RC network 136 has discharged more fully than any of the networks 140–143. Thus, the voltage at the cathode of diode No. 1 has approached its original "idle state" value of −18 V more closely than the cathodes of the diodes Nos. 2–5 have approached their idle state value. The diode No. 1 again first at point 145, and the second firing cycle begins during which each of the diodes Nos. 1–5 again fires. Then, the third cycle begins. This assumes that none of the diode firings results in a completed path, in which case the cycle firing would stop.

The logical question now arises as to why a number of primary diodes do not fire simultaneously since we purposely chose all diodes of about 30 V. For example, the diode No. 2 is exposed to, but does not fire, on the reasonably fast positive slope region 137 of diode No. 1. The answer to this question has been given above in reference to FIG. **8*a*** and described as dynamic biasing. That is, as any diode is exposed to pulse repetition firing potential, so that dynamic biasing becomes a more important factor, the exposed diode tends to fire at higher voltages.

The next logical question, "Why is there a gap 147 of approximately 17 $\mu s$ between the successive diode firings"' The answer is that experiments have been conducted on the five diode pattern of FIG. 14. During 1.6 millisecond (an exemplary duration of the applied pulse) each of these five diodes fired approximately 17–19 times. Each of these firings by the primary diodes 130 is reflected back to point 132 approximately 85–95 times (i.e. 17×5 = 85; 19×5 = 95). So, on the average, the effective inoperative time of any diode (after having been fired and then shut off) is about 85 μs, which is more than a sufficient time for the remaining diodes to have their try at completing a path. Since the RC networks (such as 136) provide only 50 μs discharge time, the remaining 35 μs could be contributed to the internal, dynamic biasing phenomena described above in connection with FIGS. 4 and 8*a*.

The scanning process in the secondary and tertiary stages is not necessarily the same as the described scanning process in the primary stage. The difference is explained by statistical evidence. In a certain network circuit, actually built and tested, it was found experimentally that, on the average, each primary diode "-scans" only one or two out of three secondary diodes at any one firing. Each secondary diode, in turn, "scans" three or so out of five tertiary diodes. With this in mind, let us proceed with a description of how the network circuit operated because it appears to be the most direct way of presenting the empirical process.

FIG. 16 represents a "worst case" of a diode field presented to a "Line Circuit"in the experimental matrix. FIG. 16 shows a fan-out pattern of diodes. By now, it should be immediately apparent how this pattern is taken from FIG. 2. Each of five primary diodes was connected to each of three secondary diodes, which in turn was connected to five tertiary diodes. The circles represent vertical buses or outlets from the states. The primary vertical buses are numbered 1–5. The tens digits at the secondary stage verticals identify associations between primary outlets and the outlets in the secondary stage (e.g. horizontal multiple outlets 11–13 connect to outlet No. 1 via three diodes). The hundred and tens digits perform a similar function in the tertiary stage (e.g. crosspoints 111–115 are in a path including vertical outlet 11 and primary outlet 1). The tertiary stage outlets are marked A1–A5, B1–B5 . . . E1–E5. If an outlet is observed to become busy, the identity of the crosspoint which makes it busy is irrelevant.

Associated with the states are tables which indicate the time when a diode firing occurs at each vertical — the time scale beginning at "0" when the first primary matrix diode fired. Thus, a reading at the vertical 11 indicates that a secondary diode fired at time "0". Readings at verticals 12, 13 indicated that they fired 100 μs later. Readings at the tertiary verticals A1–A3 indicated that tertiary diodes fired at time "0". Readings at tertiary vertical A4 indicated that a tertiary diode fired 60 μs later.

To impose stringent firing conditions, the tertiary verticals A5, B5, C5, D5 were artificially marked as busy. The end-marking was applied to vertical E5. Because of the distorted pattern of busy markings, this network required an unusually long scanning cycle. With a more normal distribution of busy paths, it is very likely that the desired path would have been completed during the first cycle.

From inspection of FIG. 16, it becomes apparent that at time "0", the primary diode No. 1 fired, causing a secondary diode to fire at No. 11; then, tertiary diodes fired at A1, A2, A3. Note that diode No. 1 had access to five quaternary inlets at A1–A5. It "scanned" only three of them. Diode No. 1 turns off if it does not become part of a completed path.

At a time 60 82 s later, primary diode No. 4 and secondary diode No. 42 fire; however, they do not have access to five quaternary outlets because the three quaternary positions A1–A3 which fired via wire 160 are now blocked by the presence of back-bias on associated RC circuits. This process continues until an outlet is found in the tertiary switches 161–165 where a connection is possible. In each case, the number of tertiary outlets which may be scanned are reduced —not enlarged — by successive firings. Thus, the effective diode field tapers and does not fan-out because of dynamic conditions in the network, such as biasing potentials applied by RC circuits to recently fired diodes.

In the data shown in FIG. 16, the proper second stage outlet No. 41 was found during the second cycle, 160 μs after beginning of scanning. Even through it is somewhat unrealistic because of the artificial busy markings, this particular data was selected as an example to be given here because it demonstrates how there is a dynamic blocking of quaternary positions. The excessively heavy "fan-out" current does not occur and the purposefully limited current is concentrated where the firing energy is required. Thus, switching in a large multi-stage network approaches the switching model described in FIG. 10.

Let us verify this by taking a second look at the dynamic biasing conditions as they appear in the network of FIG. 16 at the time (160 μs when the diode fires at outlet No. 41. The secondary verticals 41, 42, 43 includes the horizontal diodes which fired at 60 μs when the primary diode No. 1 first turned on during the first scan cycle. These same diodes cannot fire when diode No. 4 turns on during the second scan cycle because their respective tertiary verticals are dynamically biased to an inoperative state for 200 μs. Therefore, the diode having access to vertical No. 41 must fire. As a consequence of this firing, the tertiary matrix 165 is signaled. Since three (E1–E3) out of the five associated outlets are dynamically biased inoperative, the only alternative is for one or both of the two remaining diodes to fire at E4, E5. One of these two diodes has access to the equipment that is a desired terminal of the switch path. Almost the full power of the line circuit applied end-marking is available to fire this last quaternary diode. Thus, there is an obvious improvement over a matrix in which the diodes are allowed to fire blindly.

The invention provides means for enabling the size of the network to grow without a loss in efficiency. Logically, one might expect this scanning method to decrease in effectiveness as the number of secondary stage horizontals are diverted to the increased number of tertiary and quaternary stages that might be found in larger systems. In general, this does not occur, because using a more precise timing, my scanning method may be utilized to make the network operate independently of the number of secondary horizontals serving a particular tertiary and quaternary stage.

FIG. 17 represents the firing field of a particular network circuit with unconnected verticals used to show the secondary and tertiary outlets diverted to serve other tertiary and quaternary stages which are irrelevant to the connection being sought. Thus, about two-thirds of the paths in the network of FIG. 17 are useless to the search in question.

If the network is completely "idle", it is not necessary to scan all the paths to obtain a connection, because of the multiplicity of paths to point 203. However, as the various paths are completed and the network becomes progressively more busy, the number of free paths which must be scanned decreases. Simultaneously, the busy crosspoints prevent the searching in many succeeding stages. Thus, in some degree, there is a compensating effect as compared with the all parts idle case. Since it is not necessary to scan all free paths in the all idle condition, the addition of some busy paths has little practical results. Thus, the matrix blocking, due to variations in the scanning process, does not have any great effect upon the grade of service of the system—within reasonable limitations.

It should now be apparent that "fan-out" pattern of available diodes is inversely proportional to traffic which means that as traffic increases, the number of available diodes in the fan-out decreases.

The situation shown in FIG. 17 assumes the worst case of an exemplary two out of five busy condition (the dashed lines represent the busy paths). By inspection, the heavily inked path 200 is the only one available to complete the requested connection. FIG. 17 shows that the line circuit has three idle and available primary diodes and that three out of five quaternary diodes Q1, Q2, Q3 are available and have access to the end-marked point 203. However, the primary diodes 3 and 5 cannot complete a connection between the line circuit and point 203 because of the internal blocking in the network, It is assumed that this switch path (the heavily inked solid line beginning at 200) is completed 200 $\mu$s after the beginning of a "scanning" process. Also, from FIG. 17, it should be apparent that, as the primary diodes become unavailable and cease to fire, the system speeds up.

SUMMARY

The foregoing explains the circuits, operation, and principles used to build a dynamically tapered network. This summary reviews the explanation and, perhaps, clarifies the philosophy to be used when designing a network.

For this summary, a reference to an analog machine (FIG. 18) may prove helpful. Each disk 300/–302 represents the firing conditions at one switching stage. Disk 300 is analogous to conditions in the "Primary Matrix" of FIG. 2. The disks 301, 302 are analogous to conditions in the "Secondary" and "Tertiary" matrices of FIG. 2.

Each disk is separately mounted at 303, 304, 305 so that it can spin at an RPM which is entirely independent of the RPM at which the other disks spin. Each network stage scans at a frequency or cycle of pulse periods established by its own RC networks; therefore, the diodes in each stage may fire and then turn off at a rate which is entirely separate from the comparable rates of the diodes in the other stages. The analog (FIG. 18) shows this by placing the RC networks 54–57 under the analog disks. The corresponding relationships to RC circuits in FIG. 2 may be understood by comparing the reference numerals 54–57 in FIGS. 2 and 18.

The line circuit LC (FIG. 2) may place an end-marking at the primary stage. The analog shows this end-marking as a light bulb 308 looking into the primary stage disk 300. A lens 309 is analogous to electrical circuitry in the line circuit for shaping the firing pulse 131 (FIG. 14).

In any well known manner, some equipment (not shown) selects one of the control circuits 50 (FIG. 2) as the distant terminal of a switch path. This is analogous to a coincidence gate 311 (FIG. 16) which turn on, when selected, to enable a photocell 312. The photocell is analogous to a quaternary stage diode.

The static and dynamic biasing characteristics of a PNPN diode are simulated by slots cut into the disks 300–302. More particularly, each disk is opaque with light transmitting slots 315–317 cut therein to represent the time during which the diodes are turned on in each stage. For example, slot 315 may represent the turned on time period for diode D3 (FIG. 2), slot 316 represents the turned on time period of diode D5 and slot 317 represents the turned on time period of diode D6. The angular width of the slot, therefore, represents the total bias effects which occur in a particular matrix stage. For example, in FIG. 16, the diode at outlet 11 fired at time "0" and the diodes at 12, 13 were exposed to a firing pulse, but they did not fire. At 100 $\mu$s the diodes at 12, 13 fired and the diode at 11 was exposed to a firing pulse, but it did not fire. Likewise, in tertiary matrix 161, and diodes at the three lowermost outlets A1—A3 were fired at time "0", and the diode at the next upper outlet A4 was exposed to a firing pulse, but it did not fire. Likewise, at 60 $\mu$s, a diode fired at the fourth from the bottom outlet A4, and diodes at the three lowermost outlets A1—A3 experienced a firing pulse, but they did not fire. A study of FIG. 16 will reveal how other diodes experience firing pulses, which recur at different frequencies, without firing. Therefore, the firing voltages shifts for each of the diodes according to the frequency with which it experiences recurring firing pulses without actually firing, as taught in FIG. 4. The analog of FIG. 18 can simulate this condition only if one can visualize an elastic disk which opens or closes the slots 315–317 as a function of the dynamic biasing changes. Moreover, the analog also breaks down since it does not show the tapering which results from busy lines and blocking in the matrix.

With an understanding of the simulations and limitations of the analog, its operation may now be understood.

The analog FIG. 18 operates this way. An allotter selects a control circuit by turning on a coincidence gate 311; the network (FIG. 2) applies −18 volts to an outlet in the quaternary stage. The coincident gate 311 applies a potential to the photo-electric cell 312 to enable it to respond when it receives a beam of light, the end −18 V marking (FIG. 2) is applied to one side of the associated quaternary diodes to enable them to turn on when they receive a firing voltage. If all five primary paths are idle in FIG. 17, there are five primary matrix diodes which can fire cyclically. The spin rate of disk 300 is set at, say "(X5)" RPM, by the diode characteristic and the timing of the RC network 54, 55. If only the switch paths 200, 201, 202 are idle, only three primary diodes Nos. 1, 3, 5 may fire; or, conversely, if the dashed lines are busy, the primary diodes Nos. 2, 4 cannot fire. Thus, the spin rate of disk 300 is set at "(X/3)" RPM, by the diode characteristics and the RC network.

If only diode No. 1 remains available after the four primary matrix diodes Nos. 3-5 become busy, disk 300 spins at the rate "X" RPM, again set by diode characteristics and the RC network. From FIG. 15, each cycle of diode firings is equal to the time period set by the available number of diodes turning on and off. Thus, the slot 315 cyclically reappears in front of light bulb 308 at a faster rate of speed as a lesser number of diodes are available. This same thing can be seen in FIG. 15 where one cycle equals the cumulative firing time of five diodes, when they are available. If diodes Nos. 2, and 4 are inhibited from firing by a busy vertical bus, they cannot fire and the cycle length will be the cumulative time required for the three diodes Nos. 1, 3, 5, to turn on, then off. The same reduction in a cycle occurs when only one diode is available.

The relationships are not necessarily linear (X/implied by the foregoing example of "(X'5)" RPM, "(X/3) " RPM, and "(X)" RPM.

At one extreme, (all five diodes are idle), the time required to turn the diode on and then off has a greater effect. At the other extreme, the discharge time of the vertical bus capacitor (such as 55) has a greater effect. This is because the capacitor 55 has enough time to discharge while five diodes turn on and off in sequence, but it does not have enough time to discharge sufficiently while one diode turns on and off.

Although this refinement is important to practical applications of the invention, it is immaterial to an understanding of the principle. In the matrix which was actually constructed and described in FIG. 16, one cycle was about 85 $\mu$S when all five primary and available.

The same diode firing phenomena occurs in the "-Secondary and Tertiary" stages; therefore, these stages may be simulated by spinning the disks 301, 302 in approximately the same manner in which the disk 300 spins. However, there is one important difference between operation in the primary stage and in the secondary and tertiary stages, and this difference is attributed most to the dynamic biasing conditions taught FIGS. 4 and 15. In the analog of FIG. 18, the dynamic biasing effects may be partially simulated, in at least the first order of approximation, by imagining how the opening or closing of the slots 316, 317 might produce a greater or lesser time during which the light beam is transmitted.

With the foregoing in mind, it may be seen that an appearance of a firing pulse simultaneously lights bulb 308 and sets the disks 300, 301, 302 to spinning in the various modes dictated by the static and everchanging dynamic biasing conditions. Preferably, there will also be a randomness of drift or jitter in the spinning rate to simulate the effects caused by manufacturing tolerances within the diodes and the three matrix stages. When the slots 315, 316, 317 line up in all three stages, as shown in the drawing, the light from bulb 308 strikes the enabled photo-electric cell 312. In the network of FIG. 2, the analogous situation occurs when the path drawn by the heavily inked line is completed to the end-marking at one of the control circuits 50. Current flows over the completed path to hold the included diodes on. In the analog, this is equivalent to an instantaneous braking of the disks 300, 301, 302 which immediately freeze in the position that allows light from the bulb 308 to fall on the photocell 312. As long as the light continues to shine, the brakes remain on, and the voice signal is sent by modulating the light beam. In the network of FIG. 2, as long as a holding current flows over the path, the included diodes stay on, and voice signals are sent over the path by modulating the current without allowing the current to fall before the holding level.

Another way of viewing the analog is to assume that the opaque material around the slot 315 represents the time while a primary diode is inhibited after it has turned on, then off. The material around the slots 316, 317 have a similar significance for the secondary and tertiary diodes.

When I design a network, I begin with a study of the above explained diode biasing and other phenomena to discover the duration of the time period during which a diode is inhibited after it has turned on, then off. I found that the duration of this time period at the tertiary outlets is a function of the number of the connections from the secondary outlets servicing the tertiary outlet. I further found that the time duration while the tertiary diodes are inhibited is a function of the number of secondary and tertiary diode which fire responsive to the firing of a single primary diode.

Considering the tertiary diode inhibit time as a single rotation of the disk 302, the inhibit time is 2 $\pi$. For a system of one size, the secondary diode inhibit time is just a little greater than $\pi$, and the primary diode inhibit time is just a little less than $\pi$. The speed at which the primary diode loses its inhibit is fixed by its own characteristics at some minimum duration, and the primary matrix cannot operate at a faster speed. Therefore, inhibition times of the secondary and tertiary diodes are selected as a function of the minimum reliable primary diode inhibition time. However, this selection should keep the same relationship: $2\pi$ at the tertiary and $\pi+$ at the secondary—consistent with the minimum primary diode inhibition time.

As the system gets larger and the "useless searching" over dead end paths (shown by the unequipped verticals in FIG. 17) increases, the tertiary inhibit time is kept constant at 2 $\pi$, and the secondary diode inhibit time remains relatively the same. The primary diode inhibit time moves toward the time "0". In an optimum size network for, say 400 line circuits, the primary diode inhibit time will be in the order just less than $\pi/2$.

A network designed in this manner guarantees that every outlet point in the quaternary matrix will be scanned during the time $2\pi$. However, the above described technique leads to a network having a capability which is greater than required. In a practical network, it is not necessary to meet these stringent requirements. Therefore, the inhibit time may be degraded as a function of the dynamic tapering resulting from traffic through the network plus the number of possible alternative routes through the network. In the exemplary network described herein, the inhibit times were degraded to $\pi$ for the primary and $2\pi$ at both the secondary and tertiary outlets.

From the foregoing, it becomes apparent that my invention involves a high degree of sophistication. However, each of the noted characteristics may be discovered empirically by a reasonable amount of testing. Once the characteristics are known, the network may be designed quite easily. Then the network designer may trade off one characteristic against another to secure a desired effect.

Therefore, I want to make it clear that I do not limit my invention to use with any particular form of network. My preferred embodiment begins with — but goes far beyond — the Porter network. But, the intended invention covers any network where the principle of a timed systematic scan cycle or search may be used in conjunction with dynamic changes in diode characteristics and network blocking conditions to provide dynamically tapered network which (1) retains the advantages of random crosspoint selection, (2) avoids excessively heavy current conditions, (3) concentrates available current to the firing crosspoints to avoid conditions where the current becomes too thin in the last of many cascaded stages, and (4) avoids conditions where crosspoints fire in an unwanted manner to break-in on busy paths.

While the principles of the invention have been described above in connection with specific apparatus and applications, it is to be understood that this description is made only by way of example and not as a limitation on the scope of the invention.

I claim:

1. A switching network comprising a plurality of cascaded switching stages, each of said stages including an array of horizontal and vertical multiples with electronic crosspoints connected via respective first and second terminals across intersections of the multiples in the array, means coupling each vertical in one stage to a horizontal in a following stage, and timing means including a resistor-capacitor circuit connected to each of said vertical multiples and to the coupling means, the resistor-capacitor circuits coupled to the verticals in one stage each having substantially the same time constant, the resistor-capacitor circuits coupled to verticals in succeeding stages having successively longer time constants, said resistor-capacitor circuits accepting a charge when a cross-point coupled to an associated vertical conducts and providing a back-bias when the crosspoint quits conducting such that the crosspoint is prevented from conducting again after it turns off for periods proportional to the respective time constant.

2. A switching network as claimed in claim 1, in which said resistor-capacitor circuits include a connection for the capacitor between the coupling means and ground and a connection for the resistor between the coupling means and a fixed potential, said capacitor charging directly when an associated crosspoint conducts and discharging through the resistor and ground circuit when the crosspoint is non-conductive to provide the back bias to inhibit the crosspoint from conducting again.

3. An electronic switching network comprising a plurality of crosspoint stages connected in cascaded sequence, each crosspoint in a stage being connected to a plurality of crosspoints in the next cascaded stage, a timing means connected to a common terminal between each crosspoint and the next cascaded stage, said timing means including resistor-capacitor circuits, means coupling resistor-capacitor circuits having substantially the same time constant to each stage, each resistor-capacitor circuit coupled to a successive stage having a longer time constant, said timing means responding to signals from the associated crosspoint to develop a bias for controlling the turned-on time period of the crosspoint during a route search and providing a bias subsequently to inhibit said crosspoint from turning on again for a time period after having once turned off.

4. A switching circuit as claimed in claim 3, including means for applying a firing end-marking voltage to one side of said network for repeatedly switching on the crosspoints in succeeding stages, said timing means being synchronized throughout said network so that crosspoints in succeeding stages turn on in a timed relationship to maximize the transfer of power from the end-marking voltage means through said network, and resistor means coupled to limit the current available from said end-marking means and thus to enable only a predetermined number of the available ones of said crosspoints to turn on throughout said cascaded stages, said predetermined number being less than said plurality of crosspoints.

5. An electronic crosspoint switching network comprising a plurality of cascaded stages of crosspoints providing a plurality of possible alternate paths extending through said network, each path being completed via a series circuit including a single crosspoint in each cascaded stage, said alternate paths being offered via other crosspoints coupled in parallel with each crosspoint in said series connection of crosspoints, and timing means coupled to a terminal between each series connected pair of crosspoints, said timing means including resistor-capacitor circuits providing the same time constant between crosspoints of one pair of stages and successively longer time constants between succeeding pairs of stages.

6. A switching network as claimed in claim 5, in which means are included for applying a firing potential of limited power to one end of said series circuit for successively firing crosspoints in alternate paths in a sequence controlled by said timing means to conduct successive searches through said network, said power limitation precluding the firing of more than a predetermined number of crosspoints during any one of said successive searches.

7. The network of claim 5 wherein said predetermined number of crosspoints is no more than five out of at least nineteen crosspoints distributed over at least three cascaded stages in each possible path through said network.

* * * * *